US012802645B2

(12) United States Patent
Kim et al.

(10) Patent No.: US 12,802,645 B2
(45) Date of Patent: Nov. 17, 2026

(54) DISPLAY DEVICE, METHOD OF FABRICATING THE SAME AND HEAD MOUNTED DISPLAY DEVICE INCLUDING THE SAME

(71) Applicant: Samsung Display Co., LTD., Yongin-si (KR)

(72) Inventors: Kyung Man Kim, Yongin-si (KR); Tae Min Kim, Yongin-si (KR); Dong Geun Shin, Yongin-si (KR); Seung Hee Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/936,536

(22) Filed: Nov. 4, 2024

(65) Prior Publication Data

US 2025/0148992 A1 May 8, 2025

(30) Foreign Application Priority Data

Nov. 7, 2023 (KR) ........................ 10-2023-0152961

(51) Int. Cl.
*G09G 3/3266* (2016.01)

(52) U.S. Cl.
CPC .................................. *G09G 3/3266* (2013.01)

(58) Field of Classification Search
CPC ............... G09G 3/3266; G09G 3/3233; G09G 2300/0426; G09G 2300/0819;
(Continued)

(56) References Cited

U.S. PATENT DOCUMENTS

2002/0036606 A1* 3/2002 Ichikawa ............. G09G 3/3659 345/87
2012/0217521 A1* 8/2012 Ohta .................... H10K 59/879 257/89

(Continued)

FOREIGN PATENT DOCUMENTS

KR 20150059221 A * 6/2015 ....... G02F 1/133526
KR 10-2021-0098446 A 8/2021
KR 10-2435381 B1 8/2022

OTHER PUBLICATIONS

English Translation for KR20150059221A (Year: 2015).*

*Primary Examiner* — Roberto W Flores
(74) *Attorney, Agent, or Firm* — Womble Bond Dickinson (US) LLP

(57) ABSTRACT

A display device, method of fabricating the same and head mounted display device comprising the same are provided. The display device includes a semiconductor substrate including a display area, a non-display area around the display area in plan view, and transistors, a light-emitting element layer above the semiconductor substrate, and including light-emitting elements in the display area, an encapsulation layer above the light-emitting element layer, a color filter layer above the encapsulation layer, and including color filters respectively overlapping the light-emitting elements, a lens array layer above the color filter layer, in the display area, in a portion of the non-display area, and including lenses respectively overlapping the light-emitting elements and having a convex cross-sectional shape, and pattern portions in the non-display area around the lenses, and a cover layer above the lens array layer.

8 Claims, 36 Drawing Sheets

(58) Field of Classification Search
CPC ... G09G 2300/0852; G09G 2300/0861; G09G 2310/0251; H10K 59/122; H10K 59/38; H10K 59/873; H10K 59/8792; H10K 59/1201; H10K 59/1213; H10K 59/131; H10K 59/872; H10K 59/8723; H10K 77/10; H10K 59/12; H10K 59/858; H10K 59/878–879; G02B 27/017; G02B 3/005; G02B 3/0056; G02B 19/0014; G02B 19/0066; G02B 27/0172; G02B 30/27–29; H04N 13/305
See application file for complete search history.

(56) References Cited

U.S. PATENT DOCUMENTS

| | | | | |
|---|---|---|---|---|
| 2016/0246119 | A1* | 8/2016 | Nimura | G02F 1/133526 |
| 2021/0200382 | A1* | 7/2021 | Lee | G06F 3/0446 |
| 2022/0115629 | A1* | 4/2022 | Suzuki | G02B 3/0056 |
| 2024/0096242 | A1* | 3/2024 | Yamazaki | H10K 59/1213 |

* cited by examiner

DISPLAY DEVICE, METHOD OF FABRICATING THE SAME AND HEAD MOUNTED DISPLAY DEVICE INCLUDING THE SAME

CROSS-REFERENCE TO RELATED APPLICATION

The present application claims priority to, and the benefit of, Korean Patent Application No. 10-2023-0152961, filed on Nov. 7, 2023, in the Korean Intellectual Property Office, the entire disclosure of which is incorporated herein by reference.

BACKGROUND

1. Field

The present disclosure relates to a display device, a method of fabricating the same, and a head mounted display device including the same.

2. Description of the Related Art

A head mounted display (HMD) device is an image display device that is worn on a user's head in the form of glasses or a helmet, and that forms a focus at a distance close to user's eyes in front of the user's eyes. The head mounted display device may implement virtual reality (VR) or augmented reality (AR).

The head mounted display device magnifies and displays an image displayed by a small display device using a plurality of lenses. Therefore, a display device applied to the head mounted display device may suitably provide a high-resolution image, for example, an image having a resolution of 3000 pixels per inch (PPI) or more. To this end, an organic light-emitting diode on silicon (OLEDoS), which is a small organic light-emitting display device having a high resolution, has been used as the display device applied to the head mounted display device. The OLEDOS is a device that displays an image by disposing organic light-emitting diodes (OLEDs) on a semiconductor wafer substrate on which complementary metal oxide semiconductors (CMOSs) are located.

SUMMARY

Aspects of the present disclosure provide a display device including a lens array layer in which fine patterns are formed, and a cover layer located on the lens array layer, and a method of fabricating the same.

Aspects of the present disclosure also provide a head mounted display device including the display device.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to one or more embodiments of the disclosure, a display device includes a semiconductor substrate including a display area, a non-display area around the display area in plan view, and transistors, a light-emitting element layer above the semiconductor substrate, and including light-emitting elements in the display area, an encapsulation layer above the light-emitting element layer, a color filter layer above the encapsulation layer, and including color filters respectively overlapping the light-emitting elements, a lens array layer above the color filter layer, in the display area, in a portion of the non-display area, and including lenses respectively overlapping the light-emitting elements and having a convex cross-sectional shape, and pattern portions in the non-display area around the lenses, and a cover layer above the lens array layer.

The pattern portions may have a same cross-sectional shape as the lenses.

An area of the cover layer in plan view may be substantially equal to an area of the lens array layer in plan view.

The pattern portions may include linear patterns spaced apart from each other, and surrounding the display area in plan view.

Intervals between the linear patterns may be substantially equal.

Intervals between the linear patterns may be different from each other.

An interval between a pair of the linear patterns adjacent to the display area may be less than an interval between another pair of the linear patterns at an outermost portion.

An area of the cover layer in plan view may be less than an area of the lens array layer in plan view.

The pattern portions may include triangular patterns surrounding the display area and having a width decreasing from the display area toward an outside of the non-display area.

The pattern portions may include a first lens pattern portion, in which there are first lens-shaped patterns having a lower density and having a greater size than the lenses in the display area, and a second lens pattern portion, in which there are second lens-shaped patterns having a higher density and having a smaller size than the lenses in the display area, and wherein the first lens pattern portion is between the second lens pattern portion and the lenses.

The display device may further include a light-blocking member on side surfaces of the lens array layer and the cover layer.

The display device may further include a coating layer in the non-display area outside the lens array layer.

The display device may further include an emission driver and a scan driver in the non-display area, wherein the lens array layer overlaps the emission driver and the scan driver.

The display device may further include pads in the non-display area, and not overlapping the lens array layer.

According to one or more embodiments of the disclosure, a method of fabricating a display device includes forming a light-emitting element layer on a semiconductor substrate including a display area, a non-display area around the display area in plan view, and transistors, the light-emitting element layer including light-emitting elements in the display area, forming a lens array layer on the light-emitting element layer, the lens array layer being in the display area and in a portion of the non-display area, and including lenses respectively overlapping the light-emitting elements, and pattern portions in the non-display area around the lenses, forming a resin layer on the lens array layer, attaching a release film to an upper surface of the resin layer to planarize the resin layer, and forming a cover layer on the lens array layer by curing the resin layer, and removing the release film.

The pattern portions may have a same cross-sectional shape as the lenses, wherein the resin layer is self-aligned at an edge boundary of the lens array layer.

The method may further include forming a spacer in the non-display area of the semiconductor substrate, the spacer having a height that is substantially equal to a height of the cover layer.

An area of the cover layer in plan view may be substantially equal to an area of the lens array layer in plan view.

The lens array layer may include a hydrophilic organic material, wherein the resin layer includes a hydrophilic organic material, and wherein a portion of the semiconductor substrate, in which the lens array layer is not located, has lower surface energy than the lens array layer.

According to one or more embodiments of the disclosure, a head mounted display device includes a frame configured to be worn on a user's body, and corresponding to user's left and right eyes, display devices in the frame, and eyepieces respectively on the display devices, wherein the display devices include a semiconductor substrate including a display area, a non-display area around the display area in plan view, and transistors, a light-emitting element layer above the semiconductor substrate, and including light-emitting elements in the display area, an encapsulation layer above the light-emitting element layer, a color filter layer above the encapsulation layer, and including color filters respectively overlapping the light-emitting elements, a lens array layer above the color filter layer, in the display area, in a portion of the non-display area, including lenses respectively overlapping the light-emitting elements in the display area and having a convex cross-sectional shape, and including pattern portions in the non-display area around the lenses, and a cover layer above the lens array layer.

A display device according to one or more embodiments may be fabricated through a process of curing a cover layer using a lens array layer without a structure reducing or preventing overflow of a resin layer. Because a structure for forming the cover layer in the non-display area is omitted in the display device, an unnecessary area may be reduced or minimized, and a large number of display devices may be fabricated per unit wafer substrate, such that a fabrication yield may be improved.

The aspects of the present disclosure are not limited to the aforementioned aspects, and various other aspects are included in the present specification.

BRIEF DESCRIPTION OF THE DRAWINGS

The above and other aspects of the present disclosure will become more apparent by describing in detail embodiments thereof with reference to the attached drawings, in which.

DETAILED DESCRIPTION

Figure 1:
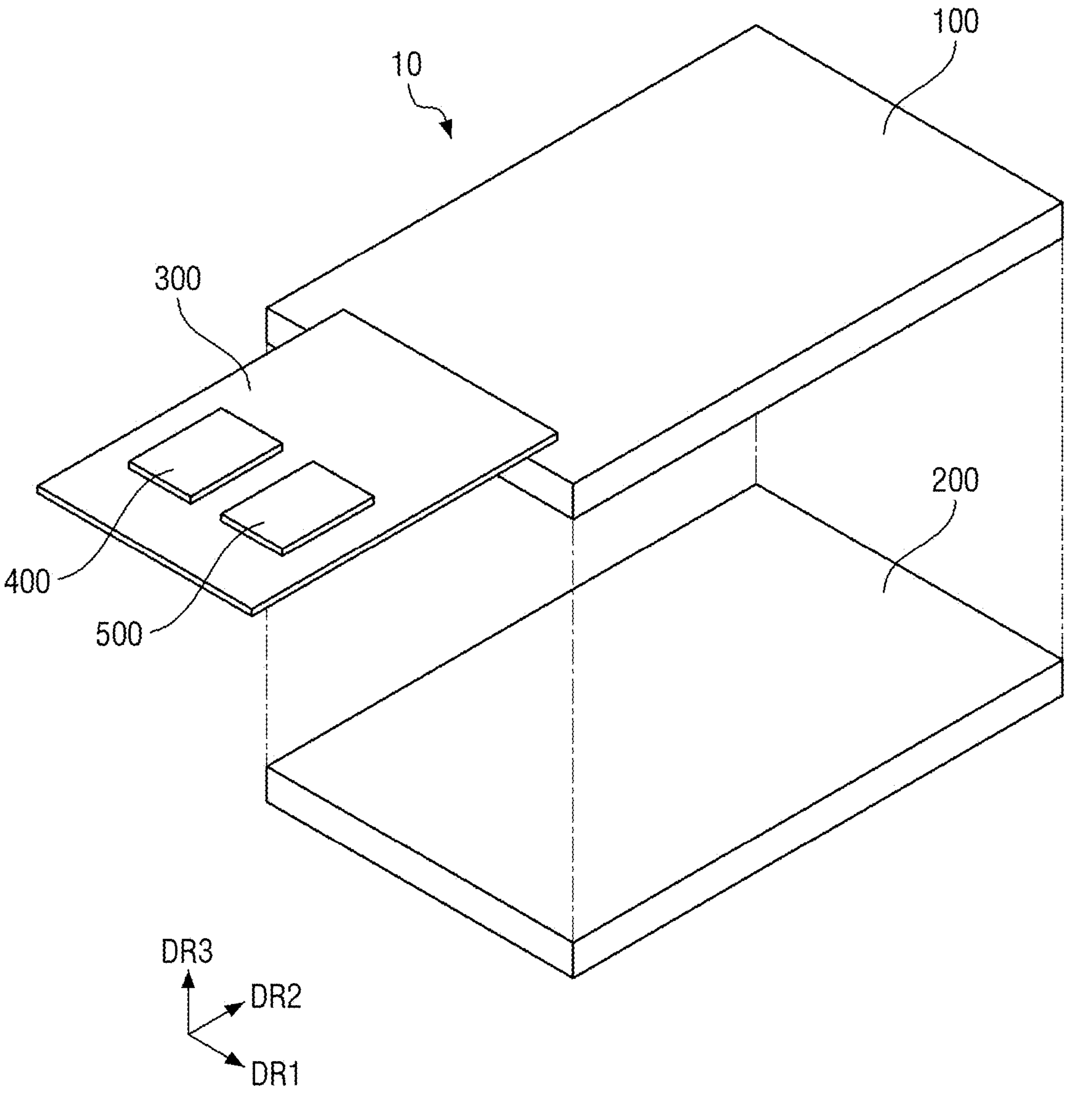
FIG. 1 is an exploded perspective view of a display device according to one or more embodiments.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure. The present disclosure covers all modifications, equivalents, and replacements within the idea and technical scope of the present disclosure. Further, each of the features of the various embodiments of the present disclosure may be combined with each other, in part or in whole, and technically various interlocking and driving are possible. Each embodiment may be implemented independently of each other or may be implemented together in an association.

In the drawings, the relative sizes of elements, layers, and regions may be exaggerated for clarity and/or descriptive purposes. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present.

The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions, such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions, such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is an exploded perspective view of a display device according to one or more embodiments.

Referring to FIG. 1, a display device 10 according to one or more embodiments is a device that displays a moving image or a still image. The display device 10 according to one or more embodiments may be applied to portable electronic devices, such as mobile phones, smartphones, tablet personal computers (PCs), mobile communication terminals, electronic notebooks, electronic books, portable multimedia players (PMPs), navigation devices, and ultra mobile PCs (UMPCs). For example, the display device 10 may be applied as a display unit of televisions, laptop computers, monitors, billboards, or the Internet of Things (IOTs) device. Alternatively, the display device 10 may be applied to smart watches, watch phones, or head mounted display (HMD) devices for realizing virtual reality and augmented reality.

The display device 10 according to one or more embodiments includes a display panel 100, a heat dissipation layer 200, a circuit board 300, a timing controller 400, and a power supply part 500.

The display panel 100 may have a shape similar to a rectangular shape in plan view. For example, the display panel 100 may have a shape similar to a rectangular shape, in plan view, having short sides in a first direction DR1, and long sides in a second direction DR2 crossing the first direction DR1. In the display panel 100, a corner where the short side in the first direction DR1 and the long side in the second direction DR2 meet may be rounded with a curvature (e.g., predetermined curvature) or right-angled. The shape of the display panel 100 in plan view is not limited to the rectangular shape, and may be a shape similar to other polygonal shapes, a circular shape, or an elliptical shape. A shape of the display device 10 in plan view may follow the shape of the display panel 100 in plan view, but is not limited thereto.

The heat dissipation layer 200 may overlap the display panel 100 in a third direction DR3, which is a thickness direction of the display panel 100. The heat dissipation layer 200 may be located on one surface, for example, a rear surface, of the display panel 100. The heat dissipation layer 200 serves to dissipate heat generated from the display panel 100. The heat dissipation layer 200 may include a metal layer made of graphite, silver (Ag), copper (Cu), or aluminum (Al) having high thermal conductivity.

The circuit board 300 may be electrically connected to a plurality of first pads PD1 (see FIG. 4) of a first pad part PDA1 (see FIG. 4) of the display panel 100 using a conductive adhesive member, such as an anisotropic conductive film. The circuit board 300 may be a flexible printed circuit board or a flexible film having a flexible material. It has been illustrated in FIG. 1 that the circuit board 300 is unbent, but the circuit board 300 may be bent. In this case, one end of the circuit board 300 may be located on the rear surface of the display panel 100 and/or a rear surface of the heat dissipation layer 200. One end of the circuit board 300 may be an end opposite to the other end of the circuit board 300 connected to the plurality of first pads PD1 (see FIG. 4) of the first pad part PDA1 (see FIG. 4) of the display panel 100 using the conductive adhesive member.

The timing controller 400 may receive digital video data DATA (see FIG. 2) and timing signals from the outside. The timing controller 400 may generate a scan timing control signal SCS (see FIG. 2), an emission timing control signal ECS (see FIG. 2), and a data timing control signal DCS (see FIG. 2) for controlling the display panel 100 according to the timing signals. The timing controller 400 may output the scan timing control signal SCS to a scan driver 610 (see FIG. 2), and may output the emission timing control signal ECS to an emission driver 620 (see FIG. 2). The timing controller 400 may output the digital video data DATA (see FIG. 2) and the data timing control signal DCS to a data driver 700 (see FIG. 2).

The power supply part 500 may generate a plurality of panel driving voltages according to an external source voltage. For example, the power supply part 500 may generate a first driving voltage VSS (see FIG. 2), a second driving voltage VDD (see FIG. 2), and a third driving voltage VINT (see FIG. 2), and may supply the first driving voltage VSS, the second driving voltage VDD, and the third driving voltage VINT to the display panel 100. The first driving voltage VSS, the second driving voltage VDD, and the third driving voltage VINT will be described later with reference to FIG. 3.

Each of the timing controller 400 and the power supply part 500 may be formed as an integrated circuit (IC), and may be attached to one surface of the circuit board 300. In this case, the scan timing control signal SCS, the emission timing control signal ECS, the digital video data DATA, and the data timing control signal DCS of the timing controller 400 may be supplied to the display panel 100 through the circuit board 300. In addition, the first driving voltage VSS, the second driving voltage VDD, and the third driving voltage VINT of the power supply part 500 may be supplied to the display panel 100 through the circuit board 300.

Alternatively, each of the timing controller 400 and the power supply part 500 may be located in a non-display area NDA (see FIG. 2) of the display panel 100, similar to the scan driver 610, the emission driver 620, and the data driver 700. In this case, the timing controller 400 may include a plurality of timing transistors, and the power supply part 500 may include a plurality of power transistors. The plurality of timing transistors and the plurality of power transistors may be formed by a semiconductor process, and may be formed on a semiconductor substrate SSUB (see FIG. 7). For example, the plurality of timing transistors and the plurality of power transistors may be formed as complementary metal oxide semiconductors (CMOSs). Each of the timing controller 400 and the power supply part 500 may be located between the data driver 700 and the first pad part PDA1 (see FIG. 4).

Figure 2:
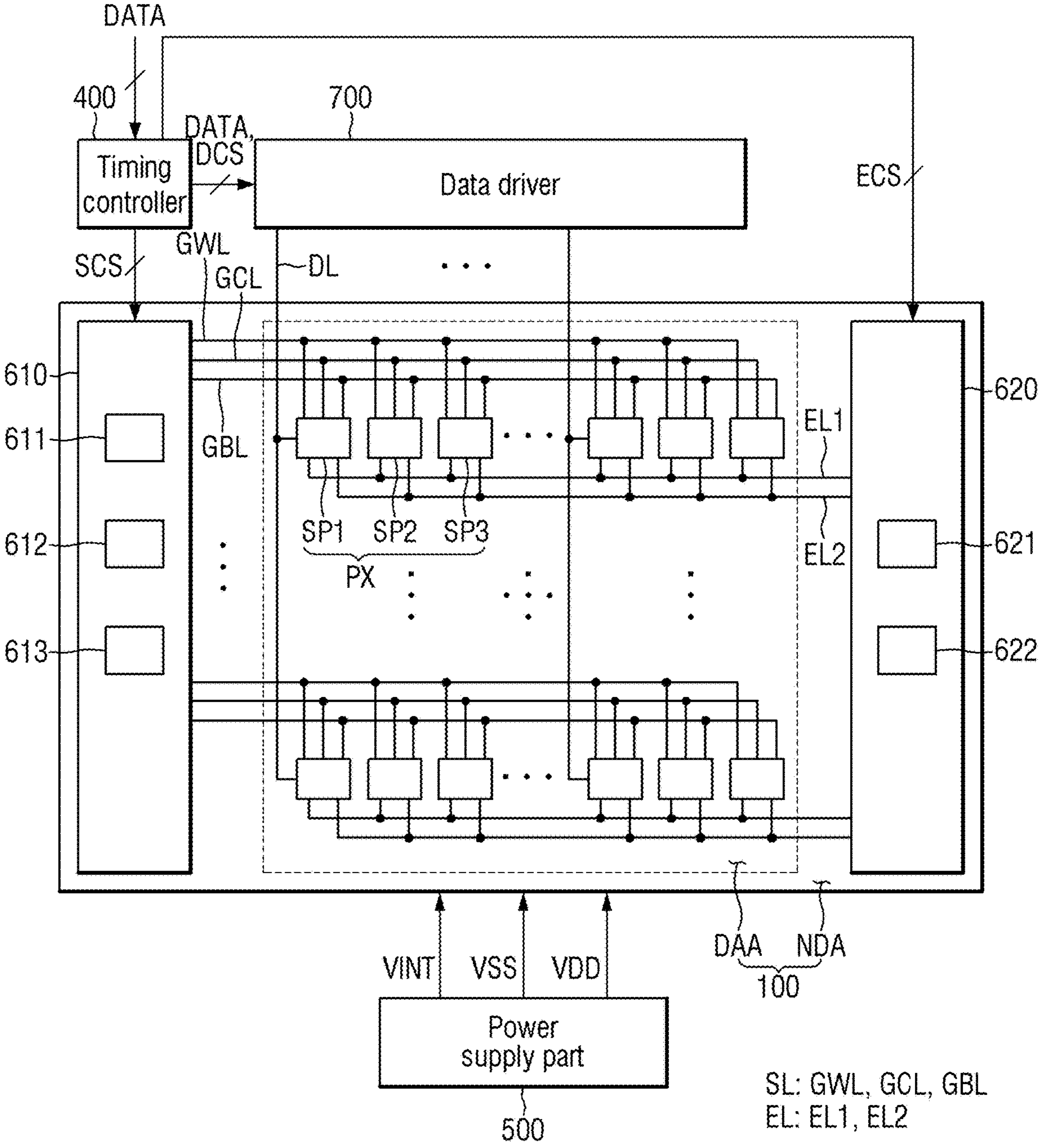
FIG. 2 is a block diagram illustrating the display device according to one or more embodiments.

FIG. 2 is a block diagram illustrating the display device according to one or more embodiments.

Referring to FIG. 2, the display panel 100 may include a display area DAA, and a non-display area NDA located around the display area DAA (e.g., in plan view). The display area DAA may emit light, or may display an image, by having a plurality of pixels PX located therein, and the non-display area NDA may not emit light or display an image.

The display panel 100 may include the plurality of pixels PX, a plurality of scan lines SL, a plurality of emission control lines EL, and a plurality of data lines DL located in the display area DAA.

The plurality of pixels PX may be arranged in the first direction DR1 and the second direction DR2. The plurality of pixels PX may be arranged in a matrix form in the display area DAA. The plurality of scan lines SL and the plurality of emission control lines EL may extend in the first direction DR1, and may be spaced apart from each other in the second direction DR2. The plurality of data lines DL may extend in the second direction DR2 and may be spaced apart from each other in the first direction DR1.

The plurality of scan lines SL may include a plurality of write scan lines GWL, a plurality of control scan lines GCL, and a plurality of bias scan lines GBL. The plurality of emission control lines EL include a plurality of first emission control lines EL1 and a plurality of second emission control lines EL2.

Figure 3:
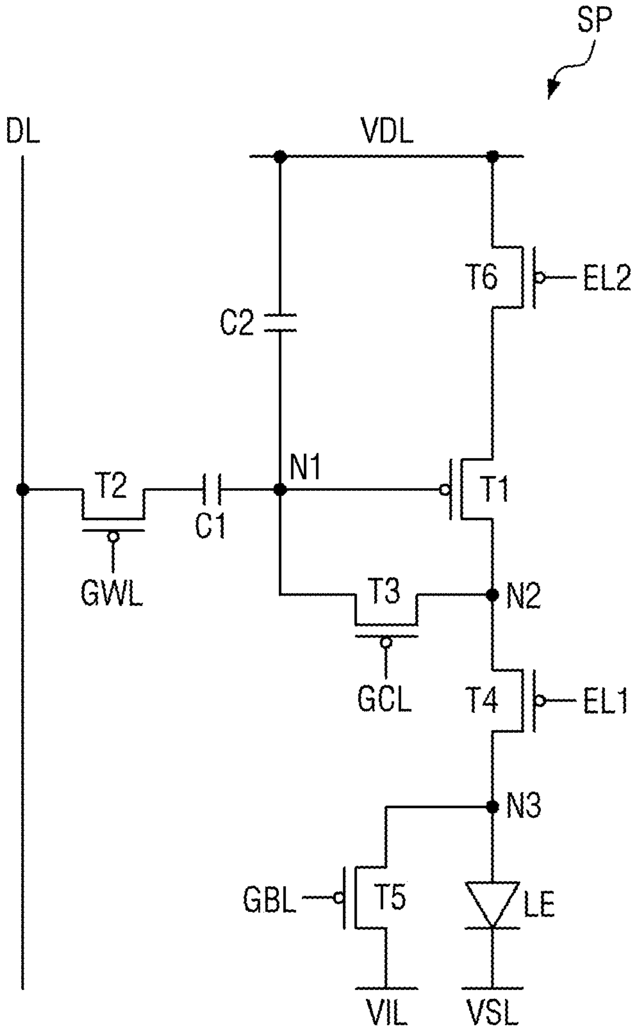
FIG. 3 is an equivalent circuit diagram of a sub-pixel according to one or more embodiments.

Each of the plurality of pixels PX may include a plurality of sub-pixels SP1, SP2, and SP3. The plurality of sub-pixels SP1, SP2, and SP3 may include a plurality of pixel transistors as illustrated in FIG. 3. The plurality of pixel transistors may be formed by a semiconductor process, and may be formed on a semiconductor substrate SSUB (see FIG. 7). For example, the plurality of pixel transistors may be formed as CMOSs.

Each of the plurality of sub-pixels SP1, SP2, and SP3 may be connected to any one of the plurality of write scan lines GWL, any one of the plurality of control scan lines GCL, any one of the plurality of bias scan lines GBL, any one of the plurality of first emission control lines EL1, any one of the plurality of second emission control lines EL2, and any one of the plurality of data lines DL. Each of the plurality of sub-pixels SP1, SP2, and SP3 may receive a data voltage of the data line DL according to a write scan signal of the write scan line GWL, and may allow a light-emitting element to emit light according to the data voltage.

The display panel 100 may include the scan driver 610, the emission driver 620, and the data driver 700 located in the non-display area NDA.

The scan driver 610 includes a plurality of scan transistors, and the emission driver 620 includes a plurality of light-emitting transistors. The plurality of scan transistors and the plurality of light-emitting transistors may be formed by a semiconductor process, and may be formed on a semiconductor substrate SSUB (see FIG. 7). For example, the plurality of scan transistors and the plurality of light-emitting transistors may be formed as CMOSs. It has been illustrated in FIG. 2 that the scan driver 610 is located on the left side of the display area DAA and the emission driver 620 is located on the right side of the display area DAA, but the present disclosure is not limited thereto. For example, the scan drivers 610 and the emission drivers 620 may be located on both the left and right sides of the display area DAA.

The scan driver 610 may include a write scan signal output part 611, a control scan signal output part 612, and a bias scan signal output part 613. Each of the write scan signal output part 611, the control scan signal output part 612, and the bias scan signal output part 613 may receive the scan timing control signal SCS from the timing controller 400. The write scan signal output part 611 may generate write scan signals according to the scan timing control signal SCS of the timing controller 400, and may sequentially output the write scan signals to the write scan lines GWL. The control scan signal output part 612 may generate control scan signals according to the scan timing control signal SCS, and may sequentially output the control scan signals to the control scan lines GCL. The bias scan signal output part 613 may generate bias scan signals according to the scan timing control signal SCS, and may sequentially output the bias scan signals to the bias scan lines GBL.

The emission driver 620 includes a first emission control driver 621 and a second emission control driver 622. Each of the first emission control driver 621 and the second emission control driver 622 may receive the emission timing control signal ECS from the timing controller 400. The first emission control driver 621 may generate first emission control signals according to the emission timing control signal ECS, and may sequentially output the first emission control signals to the first emission control lines EL1. The second emission control driver 622 may generate second emission control signals according to the emission timing control signal ECS, and may sequentially output the second emission control signals to the second emission control lines EL2.

Figure 7:
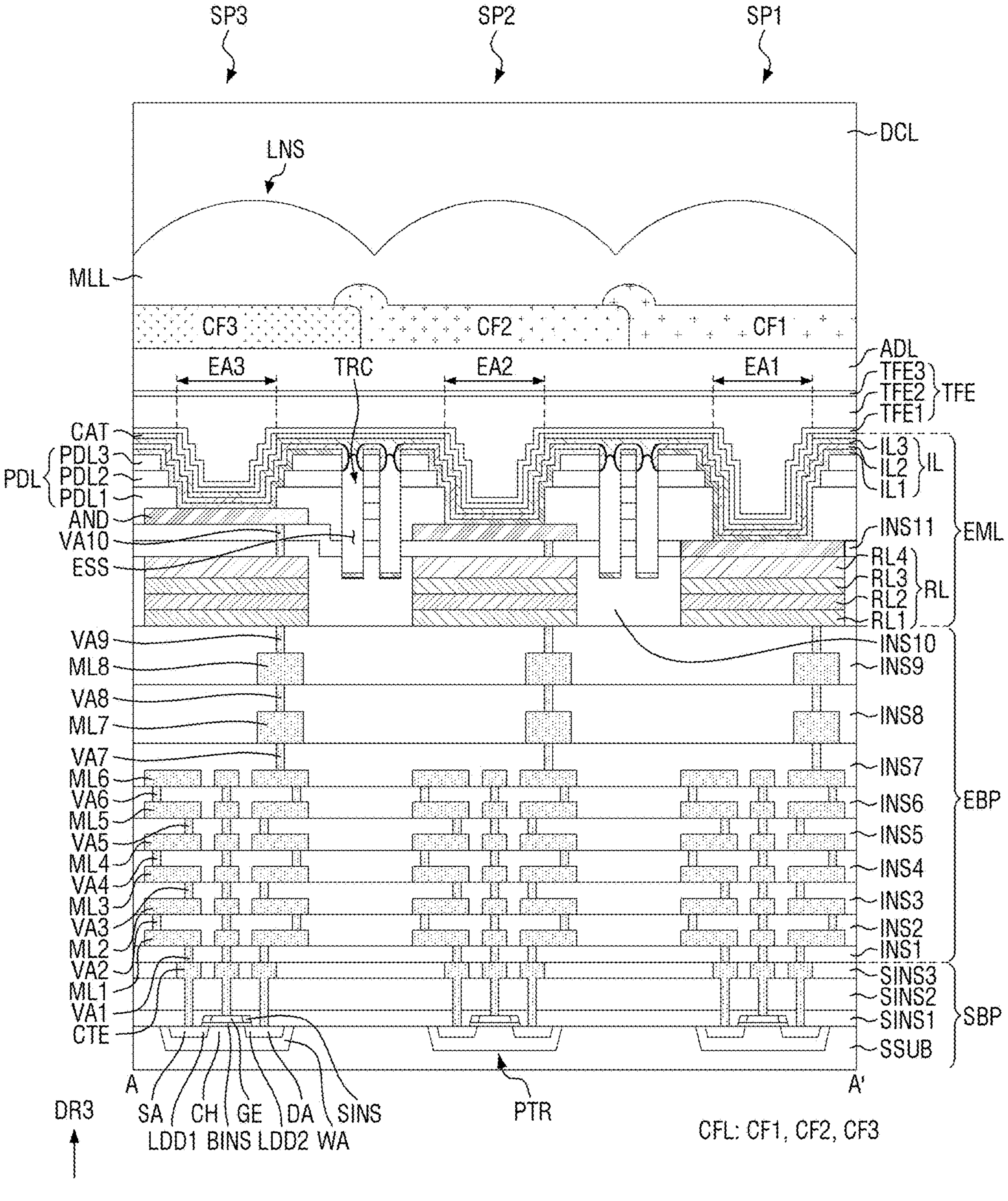
FIG. 7 is a schematic cross-sectional view taken along the line A-A' of FIG. 5.

The data driver 700 may include a plurality of data transistors, and the plurality of data transistors may be formed by a semiconductor process, and may be formed on a semiconductor substrate SSUB (see FIG. 7). For example, the plurality of data transistors may be formed as CMOSs.

The data driver 700 may receive the digital video data DATA and the data timing control signal DCS from the timing controller 400. The data driver 700 converts the digital video data DATA into analog data voltages according to the data timing control signal DCS and outputs the analog data voltages to the data lines DL. In this case, the sub-pixels SP1, SP2, and SP3 may be selected by the write scan signals of the scan driver 610, and the data voltages may be supplied to the selected sub-pixels SP1, SP2, and SP3.

FIG. 3 is an equivalent circuit diagram of a sub-pixel according to one or more embodiments.

Referring to FIG. 3, a sub-pixel SP may be connected to a write scan line GWL, a control scan line GCL, a bias scan line GBL, a first emission control line EL1, a second emission control line EL2, and a data line DL. In addition, the sub-pixel SP may be connected to a first driving voltage line VSL to which the first driving voltage VSS corresponding to a low potential voltage is applied, a second driving voltage line VDL to which the second driving voltage VDD corresponding to a high potential voltage is applied, and a third driving voltage line VIL to which the third driving voltage VINT corresponding to an initialization voltage is applied. That is, the first driving voltage line VSL may be a low potential voltage line, the second driving voltage line VDL may be a high potential voltage line, and the third driving voltage line VIL may be an initialization voltage line. In this case, the first driving voltage VSS may be a voltage lower than the third driving voltage VINT. The second driving voltage VDD may be a voltage higher than the third driving voltage VINT.

The sub-pixel SP includes a plurality of transistors T1, T2, T3, T4, T5, and T6, a light-emitting element LE, a first capacitor C1, and a second capacitor C2.

The light-emitting element LE emits light according to a driving current flowing through a channel of a first transistor T1. An amount of light emitted from the light-emitting element LE may be proportional to the driving current. The light-emitting element LE may be located between a fourth transistor T4 and the first driving voltage line VSL. A first electrode of the light-emitting element LE may be connected to a drain electrode of the fourth transistor T4, and a second electrode of the light-emitting element LE may be connected to the first driving voltage line VSL. The first electrode of the light-emitting element LE may be an anode electrode, and the second electrode of the light-emitting element LE may be a cathode electrode. The light-emitting element LE may be an organic light-emitting diode including a first electrode, a second electrode, and an organic light-emitting layer located between the first electrode and the second electrode, but is not limited thereto. For example, the light-emitting element LE may be an inorganic light-emitting element including a first electrode, a second electrode, and an inorganic semiconductor located between the first electrode and the second electrode, and in this case, the light-emitting element LE may be a micro light-emitting diode.

The first transistor T1 may be a driving transistor controlling a source-drain current (hereinafter referred to as a “driving current”) flowing between a source electrode and a drain electrode according to a voltage applied to a gate electrode thereof. The first transistor T1 includes the gate electrode connected to a first node N1, the source electrode connected to a drain electrode of a sixth transistor T6, and the drain electrode connected to a second node N2.

A second transistor T2 may be located between one electrode of the first capacitor C1 and the data line DL. The second transistor T2 is turned on by a write scan signal of the write scan line GWL to connect one electrode of the first capacitor C1 to the data line DL. For this reason, a data voltage of the data line DL may be applied to one electrode of the first capacitor C1. The second transistor ST2 includes a gate electrode connected to the write scan line GWL, a source electrode connected to the data line DL, and a drain electrode connected to one electrode of the first capacitor C1.

A third transistor T3 may be located between the first node N1 and the second node N2. The third transistor T3 is turned on by a control scan signal of the control scan line GCL to connect the first node N1 to the second node N2. For this reason, the gate electrode and the drain electrode of the first transistor T1 are connected to each other, and thus, the first transistor T1 may operate like a diode. The third transistor T3 includes a gate electrode connected to the control scan line GCL, a source electrode connected to the second node N2, and a drain electrode connected to the first node N1.

The fourth transistor T4 may be connected between the second node N2 and a third node N3. The fourth transistor T4 is turned on by a first emission control signal of the first emission control line EL1 to connect the second node N2 to the third node N3. For this reason, the driving current of the first transistor T1 may be supplied to the light-emitting element LE. The fourth transistor T4 includes a gate electrode connected to the first emission control line EL1, a source electrode connected to the second node N2, and the drain electrode connected to the third node N3.

A fifth transistor T5 may be located between the third node N3 and the third driving voltage line VIL. The fifth transistor T5 is turned on by a bias scan signal of the bias scan line GBL to connect the third node N3 to the third driving voltage line VIL. For this reason, the third driving voltage VINT of the third driving voltage line VIL may be applied to the first electrode of the light-emitting element LE. The fifth transistor T5 includes a gate electrode connected to the bias scan line GBL, a source electrode connected to the third node N3, and a drain electrode connected to the third driving voltage line VIL.

The sixth transistor T6 may be located between the source electrode of the first transistor T1 and the second driving voltage line VDL. The sixth transistor T6 is turned on by a second emission control signal of the second emission control line EL2 to connect the source electrode of the first transistor T1 to the second driving voltage line VDL. For this reason, the second driving voltage VDD of the second driving voltage line VDL may be applied to the source electrode of the first transistor T1. The sixth transistor T6 includes a gate electrode connected to the second emission control line EL2, a source electrode connected to the second driving voltage line VDL, and the drain electrode connected to the source electrode of the first transistor T1.

The first capacitor C1 is formed between the first node N1 and the drain electrode of the second transistor T2. The first capacitor C1 includes one electrode connected to the drain electrode of the second transistor T2 and the other electrode connected to the first node N1.

The second capacitor C2 is formed between the gate electrode of the first transistor T1 and the second driving voltage line VDL. The second capacitor C2 includes one electrode connected to the gate electrode of the first transistor T1 and the other electrode connected to the second driving voltage line VDL.

The first node N1 is a contact point between the gate electrode of the first transistor T1, the drain electrode of the third transistor T3, the other electrode of the first capacitor C1, and one electrode of the second capacitor C2. The second node N2 is a contact point between the drain electrode of the first transistor T1, the source electrode of the third transistor T3, and the source electrode of the fourth transistor T4. The third node N3 is a contact point between the drain electrode of the fourth transistor T4, the source electrode of the fifth transistor T5, and the first electrode of the light-emitting element LE.

Each of the first to sixth transistors T1, T2, T3, T4, T5, and T6 may be a metal oxide semiconductor field effect transistor (MOSFET). For example, each of the first to sixth transistors T1, T2, T3, T4, T5, and T6 may be a P-type MOSFET, but is not limited thereto. Each of the first to sixth transistors T1, T2, T3, T4, T5, and T6 may be an N-type MOSFET. Alternatively, some of the first to sixth transistors T1, T2, T3, T4, T5, and T6 may be P-type MOSFETs, and the others of the first to sixth transistors T1, T2, T3, T4, T5, and T6 may be N-type MOSFETs.

It has been illustrated in FIG. 3 that the sub-pixel SP includes six transistors T1, T2, T3, T4, T5, and T6 and two capacitors C1 and C2, but it is to be noted that an equivalent circuit diagram of the sub-pixel SP is not limited to that illustrated in FIG. 3. For example, the numbers of transistors and capacitors of the sub-pixel SP are not limited to those illustrated in FIG. 3.

Figure 4:
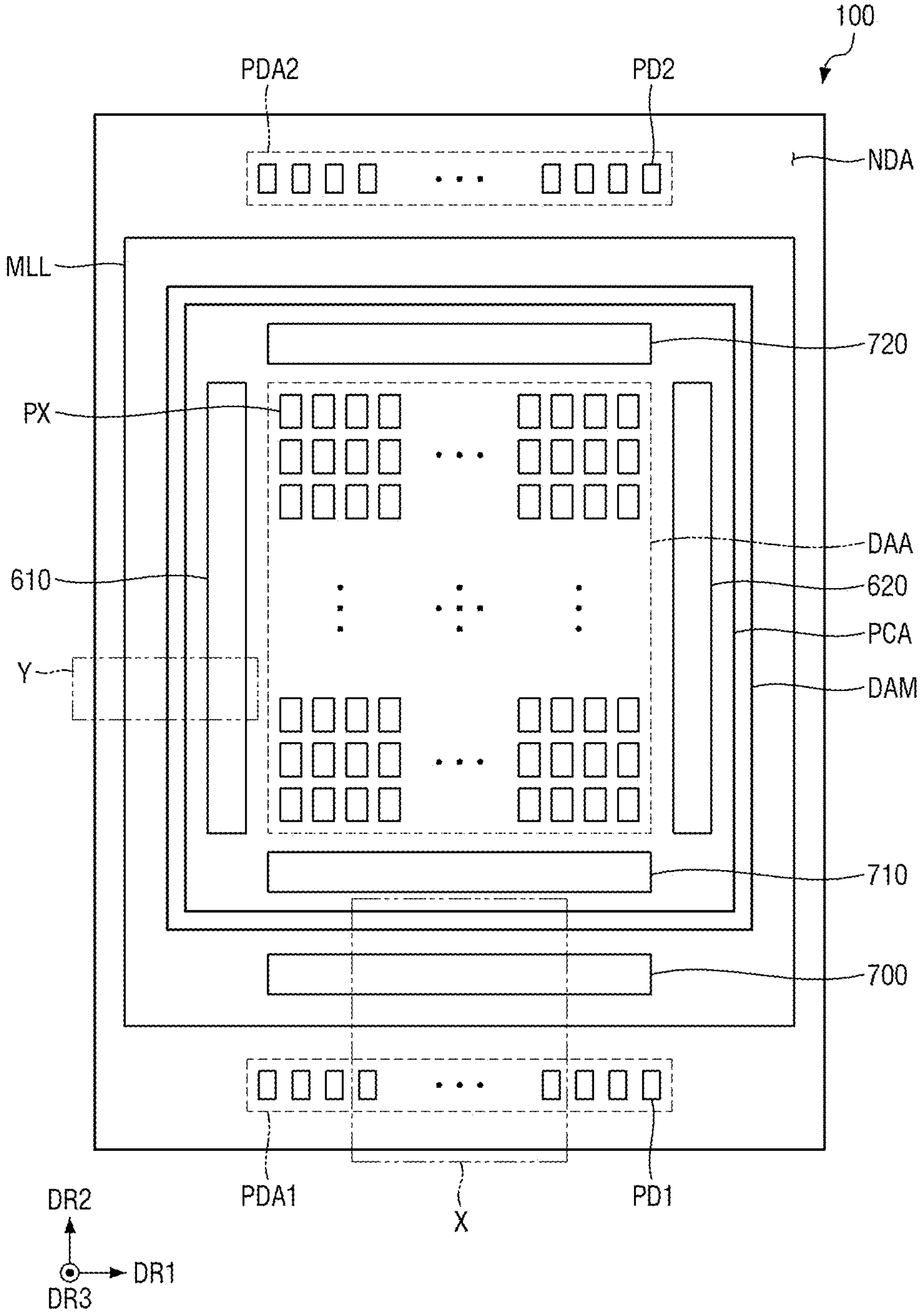
FIG. 4 is a diagram illustrating a display panel according to one or more embodiments.

FIG. 4 is a diagram illustrating a display panel according to one or more embodiments.

Referring to FIG. 4, the display panel 100 according to one or more embodiments may include a plurality of pixels PX arranged in a matrix form in the display area DAA. The display panel 100 may include a scan driver 610, an emission driver 620, a data driver 700, a first distribution circuit 710, a second distribution circuit 720, a first pad part PDA1, a second pad part PDA2, a power connection part PCA, and a dam DAM that are located in the non-display area NDA. In addition, in one or more other embodiments, the display panel 100 may further include an electrostatic protection part, a moisture permeation reduction part, and a crack reduction part that are located outside the dam DAM.

The scan driver 610 may be located on a first side of the display area DAA, and the emission driver 620 may be located on a second side of the display area DAA. For example, the scan driver 610 may be located on one side of the display area DAA in the first direction DR1, and the emission driver 620 may be located on the other side of the display area DAA in the first direction DR1. That is, the scan driver 610 may be located on the left side of the display area DAA, and the emission driver 620 may be located on the right side of the display area DAA. However, the present disclosure is not limited thereto, and the scan drivers 610 and the emission drivers 620 may be located on both the first and second sides of the display area DAA.

The first pad part PDA1 may include a plurality of first pads PD1 connected to pads or bumps of the circuit board 300 through a conductive adhesive member. The first pad part PDA1 may be located on a third side of the display area DAA. For example, the first pad part PDA1 may be located on one side of the display area DAA in the second direction DR2. That is, the first pad part PDA1 may be located closer to an edge of the display panel 100 than the data driver 700 is.

The first pad part PDA1 may be located outside the data driver 700 in the second direction DR2. That is, the first pad part PDA1 may be located closer to an edge of the display panel 100 than the data driver 700.

The second pad part PDA2 may include a plurality of second pads PD2 corresponding to inspection pads that inspect whether or not the display panel 100 operates normally. The plurality of second pads PD2 may be connected to a jig or a probe pin, or may be connected to a circuit board for inspection in an inspection process. The circuit board for inspection may be a printed circuit board made of a rigid material or a flexible printed circuit board made of a flexible material.

The first distribution circuit 710 distributes data voltages applied through the first pad part PDA1 to a plurality of data lines DL. For example, the first distribution circuit 710 may distribute data voltages applied through one first pad PD1 of the first pad part PDA1 to P data lines DL (P is a positive integer of 2 or more), and for this reason, the number of first pads PD1 may be reduced. The first distribution circuit 710 may be located on the third side of the display area DAA of the display panel 100. For example, the first distribution circuit 710 may be located on one side of the display area DAA in the second direction DR2. That is, the first distribution circuit 710 may be located on the lower side of the display area DAA.

The second distribution circuit 720 distributes signals applied through the second pad part PDA2 to the scan driver 610, the emission driver 620, and the data lines DL. The second pad part PDA2 and the second distribution circuit 720 may be components for inspecting an operation of each of the pixels PX of the display area DAA. The second distribution circuit 720 may be located on a fourth side of the display area DAA of the display panel 100. For example, the second distribution circuit 720 may be located on the other side of the display area DAA in the second direction DR2. That is, the second distribution circuit 720 may be located on the upper side of the display area DAA.

The power connection part PCA refers to an area where the second electrode of the light-emitting element LE (see FIG. 3) and a power connection electrode to which the first driving voltage VSS is applied are connected to each other to apply the first driving voltage VSS to the second electrode of the light-emitting element LE (see FIG. 3).

The power connection part PCA may surround the display area DAA (e.g., in plan view). In addition, the power connection part PCA may be located outside the scan driver 610, the emission driver 620, the first distribution circuit 710, and the second distribution circuit 720. For example, the power connection part PCA may be closer to edges of the display panel 100 than the scan driver 610, the emission driver 620, the first distribution circuit 710, and the second distribution circuit 720 are. The power connection part PCA may surround the scan driver 610, the emission driver 620, the first distribution circuit 710, and the second distribution circuit 720 (e.g., in plan view). However, the present disclosure is not limited thereto, and the power connection part PCA may also overlap at least one of the scan driver 610, the emission driver 620, the first distribution circuit 710, and the second distribution circuit 720 in the third direction DR3.

The dam DAM may be a structure for reducing or preventing the likelihood of an encapsulation organic film TFE2 (see FIG. 7) of an encapsulation layer TFE (see FIG. 7) for encapsulating the light-emitting elements LE (see FIG. 3) overflowing into the first pad part PDA1 and the second pad part PDA2.

The dam DAM may surround the display area DAA. In addition, the dam DAM may be located outside the scan driver 610, the emission driver 620, the first distribution circuit 710, and the second distribution circuit 720. For example, the dam DAM may be closer to the edges of the display panel 100 than the scan driver 610, the emission driver 620, the first distribution circuit 710, and the second distribution circuit 720. The dam DAM may surround the scan driver 610, the emission driver 620, the first distribution circuit 710, and the second distribution circuit 720. However, the present disclosure is not limited thereto, and the dam DAM may also overlap at least one of the scan driver 610, the emission driver 620, the first distribution circuit 710, and the second distribution circuit 720 in the third direction DR3.

In addition, the dam DAM may be outside the power connection part PCA (e.g., in plan view). For example, the dam DAM may be closer to the edges of the display panel 100 than the power connection part PCA is. The dam DAM may surround the power connection part PCA.

According to one or more embodiments, the display device 10 may include a lens array layer MLL located in the display panel 100. The lens array layer MLL may cover the display area DAA, and may also be located in a portion of the non-display area NDA. For example, the lens array layer MLL may overlap the display area DAA, the scan driver 610, the emission driver 620, the data driver 700, the distribution circuits 710 and 720, the power connection part PCA, and the dam DAM. However, the lens array layer MLL may not overlap a plurality of pads PD1 and PD2. The lens array layer MLL will be described in detail later with reference to other drawings.

Figure 5:
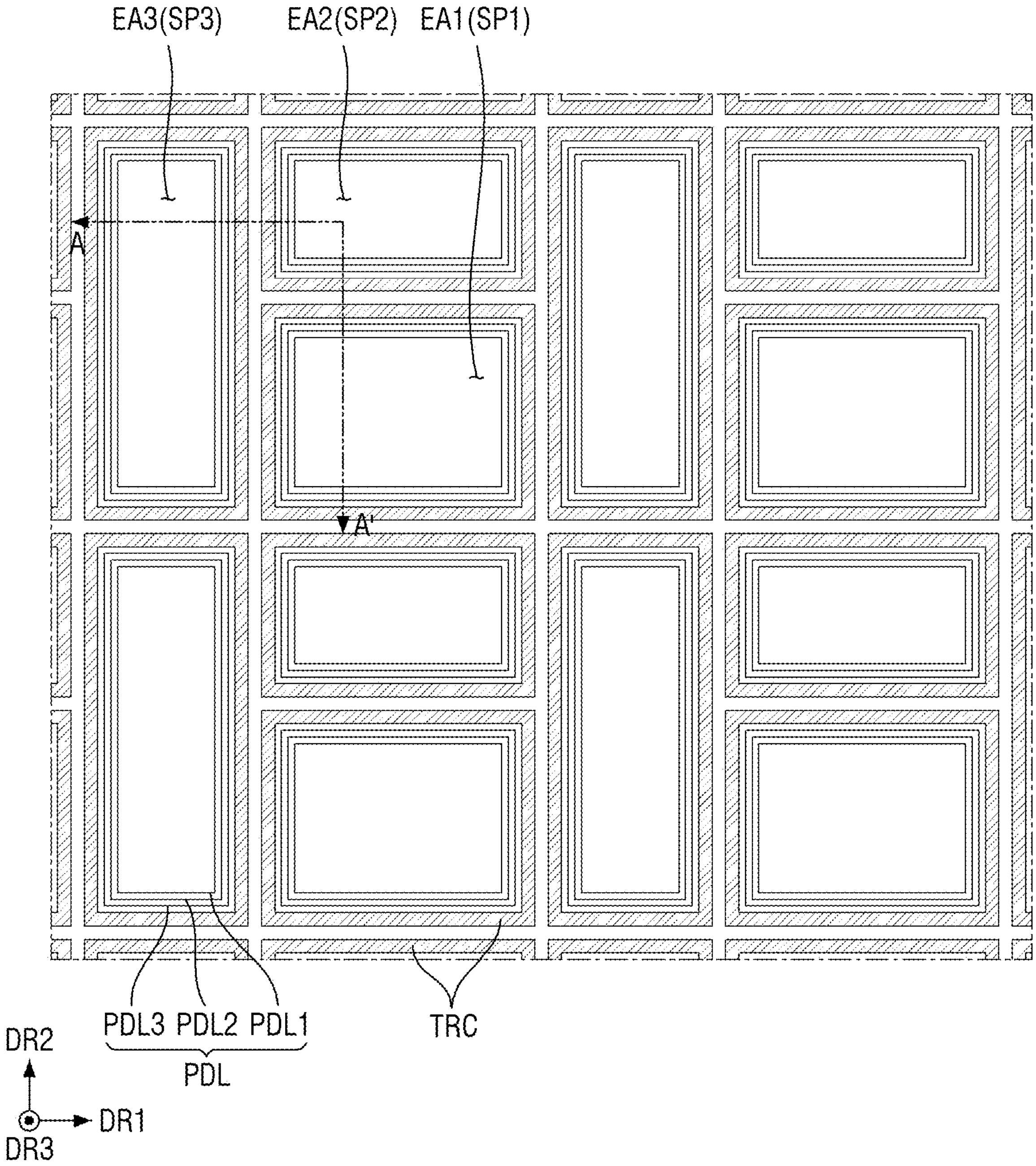
FIG. 5 is a plan view illustrating first electrodes and emission areas of a plurality of sub-pixels and a pixel-defining film that are located in a display area of FIG. 4.

FIG. 5 is a plan view illustrating first electrodes and emission areas of a plurality of sub-pixels and a pixel-defining film that are located in a display area of FIG. 4.

Referring to FIG. 5, each of the plurality of pixels PX may include a first sub-pixel SP1, a second sub-pixel SP2, and a third sub-pixel SP3. Referring to FIG. 5, the first to third sub-pixels SP1, SP2, and SP3 may include emission areas EA1, EA2, and EA3, respectively. For example, the first sub-pixel SP1 may include a first emission area EA1, the second sub-pixel SP2 may include a second emission area EA2, and the third sub-pixel SP3 may include a third emission area EA3.

Each of the first emission area EA1, the second emission area EA2, and the third emission area EA3 may be an area defined by a pixel-defining film PDL. For example, each of the first emission area EA1, the second emission area EA2, and the third emission area EA3 may be an area defined by a first pixel-defining film PDL1.

A length of the third emission area EA3 in the first direction DR1 may be less than a length of the first emission area EA1 in the first direction DR1, and less than a length of the second emission area EA2 in the first direction DR1. The length of the first emission area EA1 in the first direction DR1 and the length of the second emission area EA2 in the first direction DR1 may be substantially the same as each other.

In each of the plurality of pixels PX, the first emission area EA1 and the second emission area EA2 may neighbor each other in the second direction DR2. In addition, the first emission area EA1 and the third emission area EA3 may neighbor each other in the first direction DR1. In addition, the second emission area EA2 and the third emission area EA3 may neighbor each other in the first direction DR1. An area of the first emission area EA1, an area of the second emission area EA2, and an area of the third emission area EA3 may be different from each other.

The first emission area EA1 may emit light of a first color, the second emission area EA2 may emit light of a second color, and the third emission area EA3 may emit light of a third color. Here, the light of the first color may be light of a red wavelength band, the light of the second color may be light of a green wavelength band, and the light of the third color may be light of a blue wavelength band. For example, the blue wavelength band may indicate that a main peak wavelength of the light is included in a wavelength band of about 370 nm to about 460 nm, the green wavelength band may indicate that a main peak wavelength of the light is included in a wavelength band of about 480 nm to about 560 nm, and the red wavelength band may indicate that a main peak wavelength of the light is included in a wavelength band of about 600 nm to about 750 nm.

A first electrode AND of the light-emitting element LE may have a rectangular shape in plan view. The shape of the first electrode AND of the light-emitting element LE in plan view may be different in the first sub-pixel SP1, the second sub-pixel SP2, and the third sub-pixel SP3. For example, each of the first electrode AND of the first sub-pixel SP1 and the first electrode AND of the second sub-pixel SP2 may have a rectangular shape, in plan view, having long sides in the first direction DR1 and short sides in the second direction DR2. The first electrode AND of the third sub-pixel SP3 may have a rectangular shape, in plan view, having short sides in the first direction DR1 and long sides in the second direction DR2. A length of the first electrode AND of the third sub-pixel SP3 in the first direction DR1 may be less than a length of the first electrode AND of each of the first sub-pixel SP1 and the second sub-pixel SP2 in the first direction DR1. A length of the first electrode AND of the first sub-pixel SP1 in the second direction DR2 may be greater than a length of the first electrode AND of the second sub-pixel SP2 in the second direction DR2.

The first electrode AND of the light-emitting element LE may be connected to a reflective electrode layer RL (see FIG. 7) through a tenth via VA10 (see FIG. 7). The tenth via VA10 may overlap the first pixel-defining film PDL1, a second pixel-defining film PDL2, and a third pixel-defining film PDL3 in the third direction DR3.

At least one trench TRC may be a structure for disconnecting at least one charge generation layer of a light-emitting stack IL (see FIG. 7) between the emission areas EA1, EA2, and EA3 neighboring to each other. At least one trench TRC may be located between the first emission area EA1 and the second emission area EA2, between the first emission area EA1 and the third emission area EA3, and between the second emission area EA2 and the third emission area EA3. For example, at least one trench TRC may be located between the first electrode AND of the first sub-pixel SP1 and the first electrode AND of the second sub-pixel SP2, between the first electrode AND of the first sub-pixel SP1 and the first electrode AND of the third sub-pixel SP3, and between the first electrode AND of the second sub-pixel SP2 and the first electrode AND of the third sub-pixel SP3.

Figure 6:
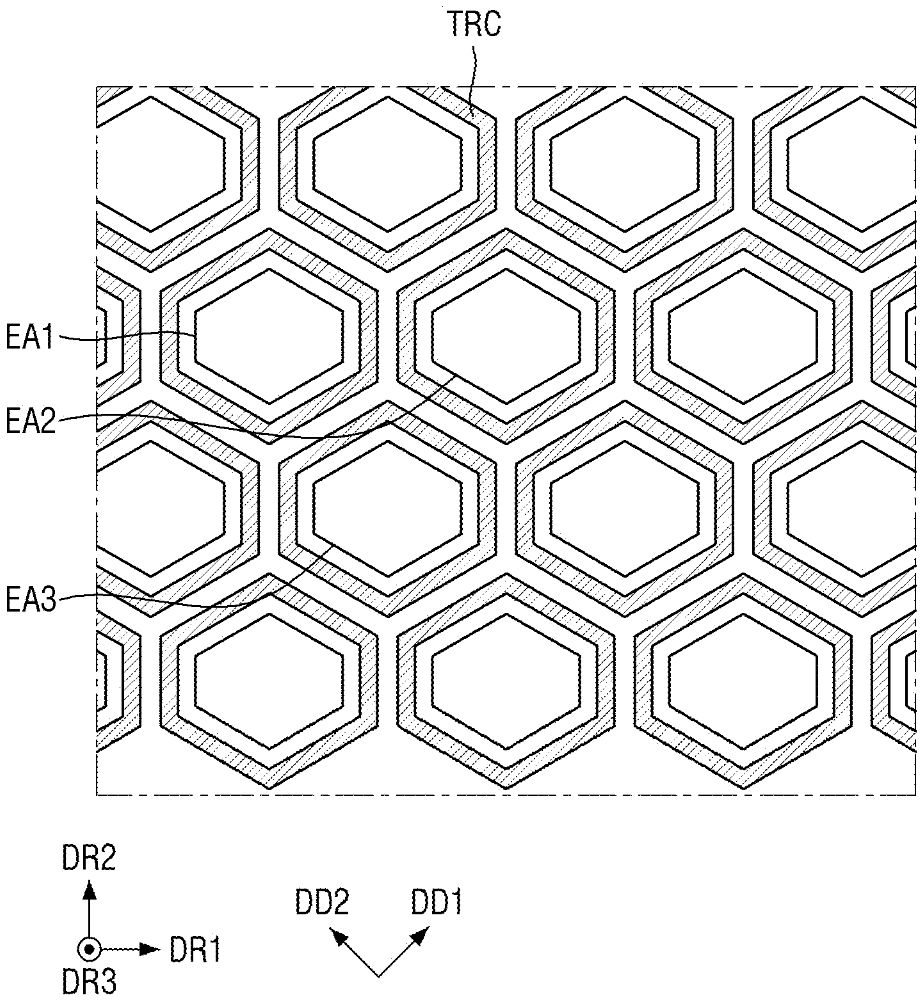
FIG. 6 is a plan view illustrating first electrodes and emission areas of a plurality of sub-pixels and a pixel-defining film according to one or more other embodiments.

FIG. 6 is a plan view illustrating first electrodes and emission areas of a plurality of sub-pixels and a pixel-defining film according to one or more other embodiments.

One or more other embodiments corresponding to FIG. 6 is substantially the same as one or more embodiments of FIG. 5 except for shapes of a first emission area EA1, a second emission area EA2, and a third emission area EA3 in plan view, and a description overlapping the description of one or more embodiments of FIG. 5 is thus omitted.

Referring to FIG. 6, the first emission area EA1, the second emission area EA2, and the third emission area EA3 may be located in a hexagonal structure having a hexagonal shape in plan view. In this case, the first emission area EA1 and the second emission area EA2 may neighbor each other in the first direction DR1, but the second emission area EA2 and the third emission area EA3 may neighbor each other in a first diagonal direction DD1, and the first emission area EA1 and the third emission area EA3 may neighbor each other in a second diagonal direction DD2. The first diagonal direction DD1 is a direction between the first direction DR1 and the second direction DR2, and may refer to a direction inclined by 45° with respect to the first direction DR1 and the second direction DR2, and the second diagonal direction DD2 may be a direction orthogonal to the first diagonal direction DD1.

It has been illustrated in FIGS. 5 and 6 that each of the plurality of pixels PX includes three emission areas EA1, EA2, and EA3, but the present disclosure is not limited thereto. For example, each of the plurality of pixels PX may also include four emission areas.

In addition, an arrangement of the emission areas EA1, EA2, and EA3 of the plurality of pixels PX is not limited to those illustrated in FIGS. 5 and 6. For example, the emission areas of the plurality of pixels PX may be located in a stripe structure in which the emission areas are arranged in the first direction DR1, a PenTile® structure in which the emission areas have a diamond arrangement, or the like (PenTile® and PENTILE™ being registered trademarks of Samsung Display Co., Ltd., Republic of Korea).

FIG. 7 is a schematic cross-sectional view taken along the line A-A' of FIG. 5.

Referring to FIG. 7, the display panel 100 may include a semiconductor backplane SBP, a light-emitting element backplane EBP, a display element layer EML, an encapsulation layer TFE, an adhesive layer ADL, a color filter layer CFL, a lens array layer MLL, and a cover layer DCL. in one or more other embodiments, the display panel 100 may further include a polarizing plate located on the cover layer DCL (as used herein, "on" may mean "above").

The semiconductor backplane SBP may include a semiconductor substrate SSUB including a plurality of pixel transistors PTR, a plurality of semiconductor insulating films covering the plurality of pixel transistors PTR, and a plurality of contact terminals CTE electrically connected to the plurality of pixel transistors PTR, respectively. The plurality of pixel transistors PTR may be the first to sixth transistors T1, T2, T3, T4, T5, and T6 described with reference to FIG. 3.

The semiconductor substrate SSUB may be a silicon substrate, a germanium substrate, or a silicon-germanium substrate. The semiconductor substrate SSUB may be a substrate doped with first-type impurities. A plurality of well regions WA may be located in an upper surface of the semiconductor substrate SSUB. The plurality of well regions WA may be regions doped with second-type impurities. The second-type impurities may be different from the first-type impurities described above. For example, when the first-type impurities are p-type impurities, the second-type impurities may be n-type impurities. Alternatively, when the first-type impurities are n-type impurities, the second-type impurities may be p-type impurities.

Each of the plurality of well regions WA includes a source region SA corresponding to a source electrode of the pixel transistor PTR, a drain region DA corresponding to a drain electrode of the pixel transistor PTR, and a channel region CH located between the source region SA and the drain region DA.

A bottom insulating film BINS may be located between a gate electrode GE and the well region WA. Side surface insulating films SINS may be located on side surfaces of the gate electrode GE. The side surface insulating films SINS may be located on the bottom insulating film BINS.

Each of the source region SA and the drain region DA may be a region doped with the first-type impurities. The gate electrode GE of the pixel transistor PTR may overlap the well region WA in the third direction DR3. The channel region CH may overlap the gate electrode GE in the third direction DR3. The source region SA may be located on one side of the gate electrode GE, and the drain region DA may be located on the other side of the gate electrode GE.

Each of the plurality of well regions WA further includes a first low-concentration impurity region LDD1 located between the channel region CH and the source region SA, and a second low-concentration impurity region LDD2 located between the channel region CH and the drain region DA. The first low-concentration impurity region LDD1 may be a region having a lower impurity concentration than the source region SA due to the bottom insulating film BINS. The second low-concentration impurity region LDD2 may be a region having a lower impurity concentration than the drain region DA due to the bottom insulating film BINS. A distance between the source region SA and the drain region DA may increase by the first low-concentration impurity region LDD1 and the second low-concentration impurity region LDD2. Therefore, a length of the channel region CH of each of the pixel transistors PTR may increase, and thus, punch-through and hot carrier phenomena caused by a short channel may be reduced or prevented.

A first semiconductor insulating film SINS1 may be located on the semiconductor substrate SSUB. The first semiconductor insulating film SINS1 may be formed as a silicon carbonitride (SiCN) or silicon oxide ($SiO_x$)-based inorganic film, but is not limited thereto.

A second semiconductor insulating film SINS2 may be located on the first semiconductor insulating film SINS1. The second semiconductor insulating film SINS2 may be formed as a silicon oxide ($SiO_x$)-based inorganic film, but is not limited thereto.

The plurality of contact terminals CTE may be located on the second semiconductor insulating film SINS2. Each of the plurality of contact terminals CTE may be connected to any one of the gate electrode GE, the source region SA, and the drain region DA of each of the pixel transistors PTR through a hole penetrating through the first semiconductor insulating film SINS1 and the second semiconductor insulating film INS2. Each of the plurality of contact terminals CTE may include any one of copper (Cu), aluminum (Al), tungsten (W), molybdenum (Mo), chromium (Cr), gold (Au), titanium (Ti), nickel (Ni), or neodymium (Nd), and alloys thereof.

A third semiconductor insulating film SINS3 may be located on the second semiconductor insulating film SINS2. The third semiconductor insulating film SINS3 may also be located on side surfaces of each of portions of the plurality of contact terminals CTE located on the second semiconductor insulating film SINS2. An upper surface of each of the plurality of contact terminals CTE may be exposed without being covered by the third semiconductor insulating film SINS3. The third semiconductor insulating film SINS3 may be formed as a silicon oxide ($SiO_x$)-based inorganic film, but is not limited thereto.

The semiconductor substrate SSUB may be replaced with a glass substrate or a polymer resin substrate, such as a polyimide substrate. In this case, thin film transistors may be located on the glass substrate or the polymer resin substrate. The glass substrate may be a rigid substrate that is not bent, and the polymer resin substrate may be a flexible substrate that may be bent or curved.

The light-emitting element backplane EBP includes first to eighth metal layers ML1, ML2, ML3, ML4, ML5, ML6, ML7, and ML8 and a plurality of vias VA1, VA2, VA3, VA4, VA5, VA6, VA7, VA8, and VA9. In addition, the light-emitting element backplane EBP includes a plurality of interlayer insulating films INS1, INS2, INS3, INS4, INS5, INS6, INS7, and INS8 located between the first to eighth metal layers ML1, ML2, ML3, ML4, ML5, ML6, ML7, and ML8.

The first to eighth metal layers ML1, ML2, ML3, ML4, ML5, ML6, ML7, and ML8 may constitute a circuit of the sub-pixel SP illustrated in FIG. 3 by connecting the plurality of contact terminals CTE exposed from the semiconductor backplane SBP to each other. That is, the first to sixth transistors T1, T2, T3, T4, T5, and T6 may be formed in the semiconductor backplane SBP, and the connection between the first to sixth transistors T1, T2, T3, T4, T5, and T6 and the formation of the first capacitor C1 and the second capacitor C2 may be performed through the first to eighth metal layers ML1, ML2, ML3, ML4, ML5, ML6, ML7, and ML8. In addition, the connection between a drain region corresponding to the drain electrode of the fourth transistor T4, a source region corresponding to the source electrode of the fifth transistor T5, and the first electrode of the light-emitting element LE may also be performed through the first to eighth metal layers ML1, ML2, ML3, ML4, ML5, ML6, ML7, and ML8.

A first interlayer insulating film INS1 may be located on the semiconductor backplane SBP. Each of first vias VA1 may penetrate through the first interlayer insulating film INS1 to be connected to the contact terminal CTE exposed from the semiconductor backplane SBP. Each of the first metal layers ML1 may be located on the first interlayer insulating film INS1, and may be connected to the first via VA1.

A second interlayer insulating film INS2 may be located on the first interlayer insulating film INS1 and the first metal layers ML1. Each of second vias VA2 may penetrate through the second interlayer insulating film INS2 to be connected to the exposed first metal layer ML1. Each of the second metal layers ML2 may be located on the second interlayer insulating film INS2, and may be connected to the second via VA2.

A third interlayer insulating film INS3 may be located on the second interlayer insulating film INS2 and the second metal layers ML2. Each of third vias VA3 may penetrate through the third interlayer insulating film INS3 to be connected to the exposed second metal layer ML2. Each of the third metal layers ML3 may be located on the third interlayer insulating film INS3, and may be connected to the third via VA3.

A fourth interlayer insulating film INS4 may be located on the third interlayer insulating film INS3 and the third metal layers ML3. Each of fourth vias VA4 may penetrate through the fourth interlayer insulating film INS4 to be connected to the exposed third metal layer ML3. Each of the fourth metal layers ML4 may be located on the fourth interlayer insulating film INS4, and may be connected to the fourth via VA4.

A fifth interlayer insulating film INS5 may be located on the fourth interlayer insulating film INS4 and the fourth metal layers ML4. Each of fifth vias VA5 may penetrate through the fifth interlayer insulating film INS5 to be connected to the exposed fourth metal layer ML4. Each of the fifth metal layers ML5 may be located on the fifth interlayer insulating film INS5, and may be connected to the fifth via VA5.

A sixth interlayer insulating film INS6 may be located on the fifth interlayer insulating film INS5 and the fifth metal layers ML5. Each of sixth vias VA6 may penetrate through the sixth interlayer insulating film INS6 to be connected to the exposed fifth metal layer ML5. Each of the sixth metal layers ML6 may be located on the sixth interlayer insulating film INS6, and may be connected to the sixth via VA6.

A seventh interlayer insulating film INS7 may be located on the sixth interlayer insulating film INS6 and the sixth metal layers ML6. Each of seventh vias VA7 may penetrate through the seventh interlayer insulating film INS7 to be connected to the exposed sixth metal layer ML6. Each of the seventh metal layers ML7 may be located on the seventh interlayer insulating film INS7, and may be connected to the seventh via VA7.

An eighth interlayer insulating film INS8 may be located on the seventh interlayer insulating film INS7 and the seventh metal layers ML7. Each of eighth vias VA8 may penetrate through the eighth interlayer insulating film INS8 to be connected to the exposed seventh metal layer ML7. Each of the eighth metal layers ML8 may be located on the eighth interlayer insulating film INS8, and may be connected to the eighth via VA8.

The first to eighth metal layers ML1, ML2, ML3, ML4, ML5, ML6, ML7, and ML8 and the first to eighth vias VA1, VA2, VA3, VA4, VA5, VA6, VA7, and VA8 may include substantially the same material. Each of the first to eighth metal layers ML1, ML2, ML3, ML4, ML5, ML6, ML7, and ML8 and the first to eighth vias VA1, VA2, VA3, VA4, VA5, VA6, VA7, and VA8 may include any one of copper (Cu), aluminum (Al), tungsten (W), molybdenum (Mo), chromium (Cr), gold (Au), titanium (Ti), nickel (Ni), and neodymium (Nd), or alloys thereof. The first to eighth vias VA1, VA2, VA3, VA4, VA5, VA6, VA7, and VA8 may include substantially the same material. The first to eighth interlayer insulating films INS1, INS2, INS3, INS4, INS5, INS6, INS7, and INS8 may be formed as silicon oxide ($SiO_x$)-based inorganic films, but are not limited thereto.

Each of a thickness of the first metal layer ML1, a thickness of the second metal layer ML2, a thickness of the third metal layer ML3, a thickness of the fourth metal layer ML4, a thickness of the fifth metal layer ML5, and a thickness of the sixth metal layer ML6 may be greater than each of a thickness of the first via VA1, a thickness of the second via VA2, a thickness of the third via VA3, a thickness of the fourth via VA4, a thickness of the fifth via VA5, and a thickness of the sixth via VA6. Each of the thickness of the second metal layer ML2, the thickness of the third metal layer ML3, the thickness of the fourth metal layer ML4, the thickness of the fifth metal layer ML5, and the thickness of the sixth metal layer ML6 may be greater than the thickness of the first metal layer ML1. The thickness of the second metal layer ML2, the thickness of the third metal layer ML3, the thickness of the fourth metal layer ML4, the thickness of the fifth metal layer ML5, and the thickness of the sixth metal layer ML6 may be substantially the same as each other. For example, the thickness of the first metal layer ML1 may be approximately 1360 Å, each of the thickness of the second metal layer ML2, the thickness of the third metal layer ML3, the thickness of the fourth metal layer ML4, the thickness of the fifth metal layer ML5, and the thickness of the sixth metal layer ML6 may be approximately 1440 Å, and each of the thickness of the first via VA1, the thickness of the second via VA2, the thickness of the third via VA3, the thickness of the fourth via VA4, the thickness of the fifth via VA5, and the thickness of the sixth via VA6 may be approximately 1150 Å.

Each of a thickness of the seventh metal layer ML7 and a thickness of the eighth metal layer ML8 may be greater than each of the thickness of the first metal layer ML1, the thickness of the second metal layer ML2, the thickness of the third metal layer ML3, the thickness of the fourth metal layer ML4, the thickness of the fifth metal layer ML5, and the thickness of the sixth metal layer ML6. Each of the thickness of the seventh metal layer ML7 and the eighth metal layer ML8 may be greater than each of a thickness of the seventh via VA7 and a thickness of the eighth via VA8. Each of the thickness of the seventh via VA7 and the thickness of the eighth via VA8 may be greater than each of the thickness of the first via VA1, the thickness of the second via VA2, the thickness of the third via VA3, the thickness of the fourth via VA4, the thickness of the fifth via VA5, and the thickness of the sixth via VA6. The thickness of the seventh metal layer ML7 and the thickness of the eighth metal layer ML8 may be substantially the same as each other. For example, each of the thickness of the seventh metal layer ML7 and the thickness of the eighth metal layer ML8 may be approximately 9000 Å. Each of the thickness of the seventh via VA7 and the thickness of the eighth via VA8 may be approximately 6000 Å.

A ninth interlayer insulating film INS9 may be located on the eighth interlayer insulating film INS8 and the eighth metal layers ML8. The ninth interlayer insulating film INS9 may be formed as a silicon oxide ($SiO_x$)-based inorganic film, but is not limited thereto.

Each of ninth vias VA9 may penetrate through the ninth interlayer insulating film INS9 to be connected to the exposed eighth metal layer ML8. Each of the ninth vias VA9 may include any one of copper (Cu), aluminum (Al), tungsten (W), molybdenum (Mo), chromium (Cr), gold (Au), titanium (Ti), nickel (Ni), and neodymium (Nd), or alloys thereof. A thickness of the ninth via VA9 may be approximately 16500 Å.

The display element layer EML may be located on the light-emitting element backplane EBP. The display element layer EML may include a reflective electrode layer RL, light-emitting elements LE, a pixel-defining film PDL, and a plurality of trenches TRC. Each of the light-emitting elements LE may include a first electrode AND, a light-emitting stack IL, and a second electrode CAT.

The reflective electrode layer RL may be located on the ninth interlayer insulating film INS9. The reflective electrode layer RL may include one or more reflective electrodes RL1, RL2, RL3, and RL4. For example, the reflective electrode layer RL may include first to fourth reflective electrodes RL1, RL2, RL3, and RL4 as illustrated in FIG. 7.

Each of the first reflective electrodes RL1 may be located on the ninth interlayer insulating film INS9, and may be connected to the ninth via VA9. Each of the first reflective electrodes RL1 may include any one of copper (Cu), aluminum (Al), tungsten (W), molybdenum (Mo), chromium (Cr), gold (Au), titanium (Ti), nickel (Ni), or neodymium (Nd), and alloys thereof. For example, each of the first reflective electrodes RL1 may include titanium nitride (TiN).

Each of the second reflective electrodes RL2 may be located on the first reflective electrode RL1. Each of the second reflective electrodes RL2 may include any one of copper (Cu), aluminum (Al), tungsten (W), molybdenum (Mo), chromium (Cr), gold (Au), titanium (Ti), nickel (Ni), or neodymium (Nd), and alloys thereof. For example, each of the second reflective electrodes RL2 may include aluminum (Al).

Each of the third reflective electrodes RL3 may be located on the second reflective electrode RL2. Each of the third reflective electrodes RL3 may include any one of copper (Cu), aluminum (Al), tungsten (W), molybdenum (Mo), chromium (Cr), gold (Au), titanium (Ti), nickel (Ni), or neodymium (Nd), and alloys thereof. For example, each of the third reflective electrodes RL3 may include titanium nitride (TiN).

Each of the fourth reflective electrodes RL4 may be located on the third reflective electrode RL3. Each of the fourth reflective electrodes RL4 may include any one of copper (Cu), aluminum (Al), tungsten (W), molybdenum (Mo), chromium (Cr), gold (Au), titanium (Ti), nickel (Ni), or neodymium (Nd), and alloys thereof. For example, each of the fourth reflective electrodes RL4 may include titanium (Ti).

The second reflective electrodes RL2 are electrodes substantially reflecting light from the light-emitting elements LE, and a thickness of the second reflective electrode RL2 may be greater than a thickness of the first reflective electrode RL1, a thickness of the third reflective electrode RL3, and a thickness of the fourth reflective electrode RL4. For example, the thickness of the first reflective electrode RL1, the third reflective electrode RL3, and the fourth reflective electrode RL4 may be approximately 100 Å, and the thickness of the second reflective electrode RL2 may be approximately 850 Å.

A tenth interlayer insulating film INS10 may be located on the ninth interlayer insulating film INS9. The tenth interlayer insulating film INS10 may be located between the reflective electrode layers RL adjacent to each other. The tenth interlayer insulating film INS10 may be located on the reflective electrode layer RL in the third sub-pixel SP3. The tenth interlayer insulating film INS10 may be formed as a silicon oxide ($SiO_x$)-based inorganic film, but is not limited thereto.

An eleventh interlayer insulating film INS11 may be located on the tenth interlayer insulating film INS10 and the reflective electrode layer RL. The eleventh interlayer insulating film INS11 may be formed as a silicon oxide ($SiO_x$)-based inorganic film, but is not limited thereto.

In consideration of a resonance distance of the light emitted from the light-emitting elements LE, the tenth interlayer insulating film INS10 and the eleventh interlayer insulating film INS11 may not be located below the first electrode AND in at least one of the first sub-pixel SP1, the second sub-pixel SP2, and the third sub-pixel SP3.

For example, the first electrode AND of the first sub-pixel SP1 may be directly located on the fourth reflective electrode RL4, and might not overlap the tenth interlayer insulating film INS10 or the eleventh interlayer insulating film INS11. The first electrode AND of the second sub-pixel SP2 may be located on the eleventh interlayer insulating film INS11, and the eleventh interlayer insulating film INS11 may be directly located on the fourth reflective electrode RL4. That is, the first electrode AND of the second sub-pixel SP2 might not overlap the tenth interlayer insulating film INS10. The first electrode AND of the third sub-pixel SP3 may be located on the eleventh interlayer insulating film INS11, and may overlap the tenth interlayer insulating film INS10.

In one or more embodiments, a distance between the first electrode AND and the reflective electrode layer RL may be different in each of the first sub-pixel SP1, the second sub-pixel SP2, and the third sub-pixel SP3. To adjust a distance from the reflective electrode layer RL to the second electrode CAT according to a respective main wavelength of light emitted from each of the first sub-pixel SP1, the second sub-pixel SP2, and third the sub-pixel SP3, the presence or absence of the tenth interlayer insulating film INS10 and/or the eleventh interlayer insulating film INS11 may be set in each of the first sub-pixel SP1, the second sub-pixel SP2, and the third sub-pixel SP3. For example, in FIG. 7, a distance between the first electrode AND and the reflective electrode layer RL in the third sub-pixel SP3 may be greater than a distance between the first electrode AND and the reflective electrode layer RL in the second sub-pixel SP2, and may be greater than a distance between the first electrode AND and the reflective electrode layer RL in the first sub-pixel SP1. The distance between the first electrode AND and the reflective electrode layer RL in the second sub-pixel SP2 may be greater than the distance between the first electrode AND and the reflective electrode layer RL in the first sub-pixel SP1. However, the present disclosure is not limited thereto. The distance between the first electrode AND and the reflective electrode layer RL in each of the sub-pixels SP1, SP2, and SP3 may be variously modified and designed.

In addition, it has been illustrated in FIG. 7 that the tenth interlayer insulating film INS10 and the eleventh interlayer insulating film INS11 are included, but a twelfth interlayer insulating film may be further located below the first electrode AND of the sub-pixel SP. In this case, the eleventh interlayer insulating film INS11 and the twelfth interlayer insulating film may be located below the first electrode AND of the second sub-pixel SP2. Also in this case, the tenth interlayer insulating film INS10, the eleventh interlayer insulating film INS11, and the twelfth interlayer insulating film may be located below the first electrode AND of the third sub-pixel SP3.

Each of tenth vias VA10 may penetrate through the tenth interlayer insulating film INS10 and/or the eleventh interlayer insulating film INS11 in the second sub-pixel SP2 and the third sub-pixel SP3 to be connected to the exposed fourth reflective electrode RL4. Each of the tenth vias VA10 may include any one of copper (Cu), aluminum (Al), tungsten (W), molybdenum (Mo), chromium (Cr), gold (Au), titanium (Ti), nickel (Ni), or neodymium (Nd), and alloys thereof. A thickness of the tenth via VA10 in the second sub-pixel SP2 may be less than a thickness of the tenth via VA10 in the third sub-pixel SP3.

The first electrode AND of each of the light-emitting elements LE may be located on the fourth reflective electrodes RL4, the tenth interlayer insulating film INS10 or the eleventh interlayer insulating film INS11, and may be connected to the tenth via VA10. The first electrode AND of each of the light-emitting elements LE may be connected to the drain region DA or the source region SA of the pixel transistor PTR through the tenth via VA10, the first to fourth reflective electrodes RL1, RL2, RL3, and RL4, the first to ninth vias VA1, VA2, VA3, VA4, VA5, VA6, VA7, VA8, and VA9, the first to eighth metal layers ML1, ML2, ML3, ML4, ML5, ML6, ML7, and ML8, and the contact terminal CTE. The first electrode AND of each of the light-emitting elements LE may include any one of copper (Cu), aluminum (Al), tungsten (W), molybdenum (Mo), chromium (Cr), gold (Au), titanium (Ti), nickel (Ni), and neodymium (Nd), or alloys thereof. For example, the first electrode AND of each of the light-emitting elements LE may include titanium nitride (TiN).

The pixel-defining film PDL may be located on a partial area of the first electrode AND of each of the light-emitting elements LE. The pixel-defining film PDL may cover an edge of the first electrode AND of each of the light-emitting elements LE. The pixel-defining film PDL serves to partition first emission areas EA1, second emission areas EA2, and third emission areas EA3.

The first emission area EA1 may be defined as an area where the first electrode AND, the light-emitting stack IL, and the second electrode CAT are sequentially stacked in the first sub-pixel SP1 to emit light. The second emission area EA2 may be defined as an area where the first electrode AND, the light-emitting stack IL, and the second electrode CAT are sequentially stacked in the second sub-pixel SP2 to emit light. The third emission area EA3 may be defined as an area where the first electrode AND, the light-emitting stack IL, and the second electrode CAT are sequentially stacked in the third sub-pixel SP3 to emit light.

The pixel-defining film PDL may include first to third pixel-defining films PDL1, PDL2, and PDL3. The first pixel-defining film PDL1 may be located on the edge of the first electrode AND of each of the light-emitting elements LE, the second pixel-defining film PDL2 may be located on the first pixel-defining film PDL1, and the third pixel-defining film PDL3 may be located on the second pixel-defining film PDL2. The first pixel-defining film PDL1, the second pixel-defining film PDL2, and the third pixel-defining film PDL3 may be formed as silicon oxide ($SiO_x$)-based inorganic films, but are not limited thereto. Each of a thickness of the first pixel-defining film PDL1, a thickness of the second pixel-defining film PDL2, and a thickness of the third pixel-defining film PDL3 may be approximately 500 Å.

When the first pixel-defining film PDL1, the second pixel-defining film PDL2, and the third pixel-defining film PDL3 are formed as one pixel-defining film, a height of the one pixel-defining film increases, such that a first encapsulation inorganic film TFE1 may be disconnected due to step coverage. The step coverage refers to a ratio of a degree at which a thin film is coated on an inclined portion to a degree at which a thin film is coated on a flat portion. The lower the step coverage, the more likely it is that the thin film will be disconnected at the inclined portion.

To reduce or prevent the likelihood of the first encapsulation inorganic film TFE1 being disconnected due to the step coverage, the first pixel-defining film PDL1, the second pixel-defining film PDL2, and the third pixel-defining film PDL3 may have a cross-sectional structure with a step having a staircase shape. For example, a width of the first pixel-defining film PDL1 may be greater than a width of the second pixel-defining film PDL2 and greater than a width of the third pixel-defining film PDL3. Also, the width of the second pixel-defining film PDL2 may be greater than the width of the third pixel-defining film PDL3. The width of the first pixel-defining film PDL1 may refer to a length, in a horizontal direction, of the first pixel-defining film PDL1 defined by the first direction DR1 and the second direction DR2.

Each of the plurality of trenches TRC may penetrate through the first pixel-defining film PDL1, the second pixel-defining film PDL2, and the third pixel-defining film PDL3. In each of the plurality of trenches TRC, a portion of the tenth interlayer insulating film INS10 may be trenched, and the eleventh interlayer insulating film INS11 may be penetrated.

At least one trench TRC may be located between the sub-pixels SP1, SP2, and SP3 neighboring to each other. It has been illustrated in FIG. 7 that two trenches TRC are located between the sub-pixels SP1, SP2, and SP3 neighboring to each other, but the present disclosure is not limited thereto.

The light-emitting stack IL may include a plurality of stack layers. It has been illustrated in FIG. 7 that the light-emitting stack IL has a three-tandem structure including a first stack layer IL1, a second stack layer IL2, and a third stack layer IL3, but the present disclosure is not limited thereto. For example, the light-emitting stack IL may have a two-tandem structure including two stack layers.

In the three-tandem structure, the light-emitting stack IL may have a tandem structure including a plurality of stack layers IL1, IL2, and IL3 emitting different light, respectively. For example, the light-emitting stack IL may include a first stack layer IL1 emitting light of a first color, a second stack layer IL2 emitting light of a third color, and a third stack layer IL3 emitting light of a second color. The first stack layer IL1, the second stack layer IL2, and the third stack layer IL3 may be sequentially stacked.

The first stack layer IL1 may have a structure in which a first hole-transporting layer, a first organic light-emitting layer emitting the light of the first color, and a first electron-transporting layer are sequentially stacked. The second stack layer IL2 may have a structure in which a second hole-transporting layer, a second organic light-emitting layer emitting the light of the third color, and a second electron-transporting layer are sequentially stacked. The third stack layer IL3 may have a structure in which a third hole-transporting layer, a third organic light-emitting layer emitting the light of the second color, and a third electron-transporting layer are sequentially stacked.

A first charge generation layer for supplying charges to the second stack layer IL2, and for supplying electrons to the first stack layer IL1, may be located between the first stack layer IL1 and the second stack layer IL2. The first charge generation layer may include an N-type charge generation layer for supplying electrons to the first stack layer IL1, and a P-type charge generation layer for supplying holes to the second stack layer IL2. The N-type charge generation layer may include a dopant of a metal material.

A second charge generation layer for supplying charges to the third stack layer IL3, and for supplying electrons to the second stack layer IL2 may be located between the second stack layer IL2 and the third stack layer IL3. The second charge generation layer may include an N-type charge generation layer for supplying electrons to the second stack layer IL2, and a P-type charge generation layer for supplying holes to the third stack layer IL3.

The first stack layer IL1 may be located on the first electrodes AND and the pixel-defining film PDL, and may be located on a bottom surface of each of the trenches TRC. Due to the trenches TRC, the first stack layer IL1 may be disconnected between the sub-pixels SP1, SP2, and SP3 neighboring to each other. The second stack layer IL2 may be located on the first stack layer IL1. Due to the trenches TRC, the second stack layer IL2 may be disconnected between the sub-pixels SP1, SP2, and SP3 neighboring to each other. A cavity or an empty space may be located between the first stack layer IL1 and the second stack layer IL2. The third stack layer IL3 may be located on the second stack layer IL2. The third stack layer IL3 may not be disconnected by the trenches TRC, and may cover the second stack layer IL2 in each of the trenches TRC. That is, in the three-tandem structure, each of the plurality of trenches TRC may be a structure for disconnecting the first and second stack layers IL1 and IL2, the first charge generation layer, and the second charge generation layer of the display element layer EML between the sub-pixels SP1, SP2, and SP3 neighboring to each other. In addition, in the two-tandem structure, each of the plurality of trenches TRC may be a structure for disconnecting a charge generation layer located between a lower stack layer and an upper stack layer.

To stably disconnect the first and second stack layers IL1 and IL2 of the display element layer EML between the sub-pixels SP1, SP2, and SP3 neighboring to each other, a height of each of the plurality of trenches TRC may be greater than a height of the pixel-defining film PDL. The height of each of the plurality of trenches TRC refers to a length of each of the plurality of trenches TRC in the third direction DR3. The height of the pixel-defining film PDL refers to a length of the pixel-defining film PDL in the third direction DR3. To disconnect the first and second stack layers IL1 and IL2 of the display element layer EML between the sub-pixels SP1, SP2, and SP3 neighboring to each other, other structures may exist instead of the trenches TRC. For example, instead of the trenches TRC, partition walls having a reverse tapered shape may be located on the pixel-defining film PDL.

The number of stack layers IL1, IL2, and IL3 emitting the different light is not limited to that illustrated in FIG. 7. For example, the light-emitting stack IL may include two stack layers. In this case, any one of the two stack layers may be substantially the same as the first stack layer IL1, and the other of the two stack layers may include a second hole-transporting layer, a second organic light-emitting layer, a third organic light-emitting layer, and a second electron-transporting layer. In this case, a charge generation layer for supplying electrons to any one stack layer, and for supplying charges to the other stack layer may be located between the two stack layers.

In addition, it has been illustrated in FIG. 7 that the first to third stack layers IL1, IL2, and IL3 are all located in the first emission area EA1, the second emission area EA2, and the third emission area EA3, but the present disclosure is not limited thereto. For example, the first stack layer IL1 may be located in the first emission area EA1, and may not be located in the second emission area EA2 and the third emission area EA3. In addition, the second stack layer IL2 may be located in the second emission area EA2, and may not be located in the first emission area EA1 and the third emission area EA3. In addition, the third stack layer IL3 may be located in the third emission area EA3, and may not be located in the first emission area EA1 and the second emission area EA2. In this case, first to third color filters CF1, CF2, and CF3 of the color filter layer CFL may be omitted.

The second electrode CAT may be located on the third stack layer IL3. The second electrode CAT may be located on the third stack layer IL3 in each of the plurality of trenches TRC. The second electrode CAT may be made of a transparent conductive material (TCO), such as indium tin oxide (ITO) or indium zinc oxide (IZO) capable of transmitting light therethrough, or a semi-transmissive conductive material, such as magnesium (Mg), silver (Ag), or an alloy of magnesium (Mg) and silver (Ag). When the second electrode CAT is made of the semi-transmissive conductive material, light emission efficiency of each of the first to third sub-pixels SP1, SP2, and SP3 may be increased by a micro cavity.

The encapsulation layer TFE may be located on the display element layer EML. The encapsulation layer TFE may include at least one encapsulation inorganic film TFE1 or TFE3 to reduce or prevent permeation of oxygen or moisture into the display element layer EML. In addition, the encapsulation layer TFE may include at least one encapsulation organic film TFE2 to protect the display element layer EML from foreign substances, such as dust. For example, the encapsulation layer TFE may include a first encapsulation inorganic film TFE1, an encapsulation organic film TFE2, and a second encapsulation inorganic film TFE3.

The first encapsulation inorganic film TFE1 may be located on the second electrode CAT, the encapsulation organic film TFE2 may be located on the first encapsulation inorganic film TFE1, and the second encapsulation inorganic film TFE3 may be located on the encapsulation organic film TFE2. The first encapsulation inorganic film TFE1 and the second encapsulation inorganic film TFE3 may be formed as multiple films in which one or more inorganic films of a silicon nitride ($SiN_x$) layer, a silicon oxynitride ($SiO_xN_y$) layer, a silicon oxide ($SiO_x$) layer, a titanium oxide ($TiO_x$) layer, and an aluminum oxide ($AlO_x$) layer are alternately stacked. The encapsulation organic film TFE2 may be made of a monomer. Alternatively, the encapsulation organic film TFE2 may be an organic film made of an acrylic resin, an epoxy resin, a phenolic resin, a polyamide resin, a polyimide resin, or the like.

The adhesive layer ADL may be located on the encapsulation layer TFE. The adhesive layer ADL may be a layer for adhering the encapsulation layer TFE and a layer located thereon to each other. The adhesive layer ADL may be a double-sided adhesive member. In addition, the adhesive layer ADL may be a transparent adhesive member, such as a transparent adhesive or a transparent adhesive resin.

The color filter layer CFL, the lens array layer MLL, and the cover layer DCL may be located on the adhesive layer ADL. The color filter layer CFL, the lens array layer MLL, and the cover layer DCL may constitute an optical layer of the display panel 100.

The color filter layer CFL may include a plurality of color filters CF1, CF2, and CF3, and may be located on the adhesive layer ADL. The first color filter CF1 may overlap the first emission area EA1 of the first sub-pixel SP1. The first color filter CF1 may transmit the light of the first color, that is, the light of the red wavelength band, therethrough. Therefore, the first color filter CF1 may transmit the light of the first color among light emitted from the first emission area EA1 therethrough.

The second color filter CF2 may overlap the second emission area EA2 of the second sub-pixel SP2. The second color filter CF2 may transmit the light of the second color, that is, the light of the green wavelength band, therethrough. Therefore, the second color filter CF2 may transmit the light of the second color among light emitted from the second emission area EA2 therethrough.

The third color filter CF3 may overlap the third emission area EA3 of the third sub-pixel SP3. The third color filter CF3 may transmit the light of the third color, that is, the light of the blue wavelength band, therethrough. Therefore, the third color filter CF3 may transmit the light of the third color among light emitted from the third emission area EA3 therethrough.

The lens array layer MLL may be located on the color filter layer CFL. The lens array layer MLL may include a plurality of lenses LNS located in the display area DAA. Each of the plurality of lenses LNS may be located on the first color filter CF1, the second color filter CF2, and the third color filter CF3. Each of the plurality of lenses LNS may be a structure for increasing a ratio of light directed to a front surface of the display device 10. Each of the plurality of lenses LNS may have a cross-sectional shape convex in an upward direction.

The cover layer DCL may be located on the lens array layer MLL. The cover layer DCL may have a refractive index (e.g., predetermined refractive index) so that light travels in the third direction DR3 at an interface between the plurality of lenses LNS and the cover layer DCL. In addition, the cover layer DCL may be a planarizing layer. The cover layer DCL may be an organic film made of an acrylic resin, an epoxy resin, a phenolic resin, a polyamide resin, a polyimide resin, or the like.

In one or more other embodiments, a polarizing plate may be located on the cover layer DCL. The polarizing plate may be a structure for reducing or preventing deterioration in visibility due to external light reflection. The polarizing plate may include a linear polarizing plate and a phase retardation film. For example, the phase retardation film may be a $\lambda/4$ plate (quarter-wave plate), but is not limited thereto. However, when visibility due to external light reflection is sufficiently improved by the first to third color filters CF1, CF2, and CF3, the polarizing plate may be omitted.

As illustrated in FIG. 7, by forming the light-emitting element backplane EBP and the display element layer EML on the semiconductor substrate SSUB on which the plurality of transistors are formed, a size of the plurality of pixels PX may be significantly reduced, and thus, the display device 10 displaying a high-resolution image may be provided.

Figure 8:
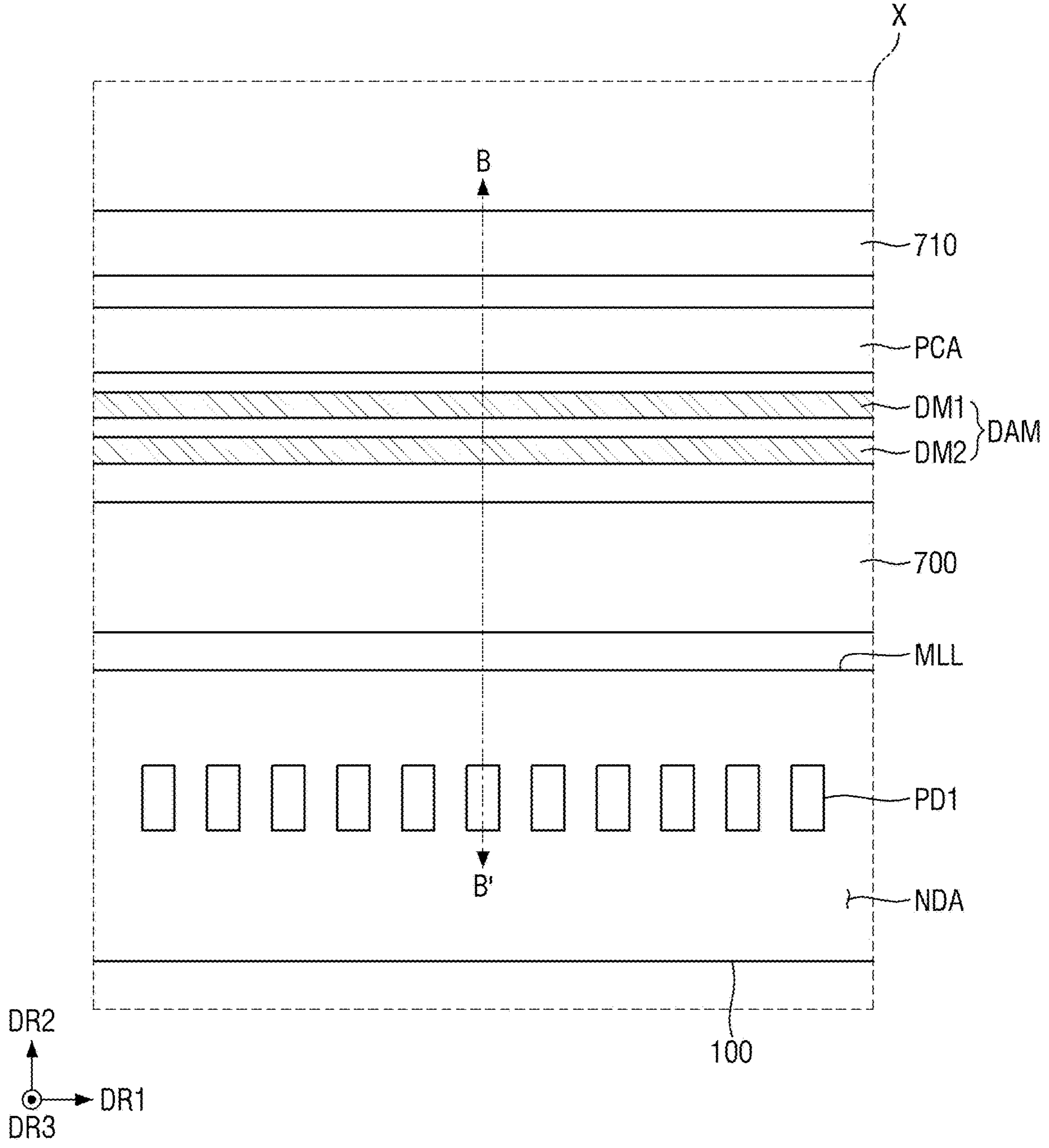
FIG. 8 is an enlarged view of area X of FIG. 4.
Figure 9:
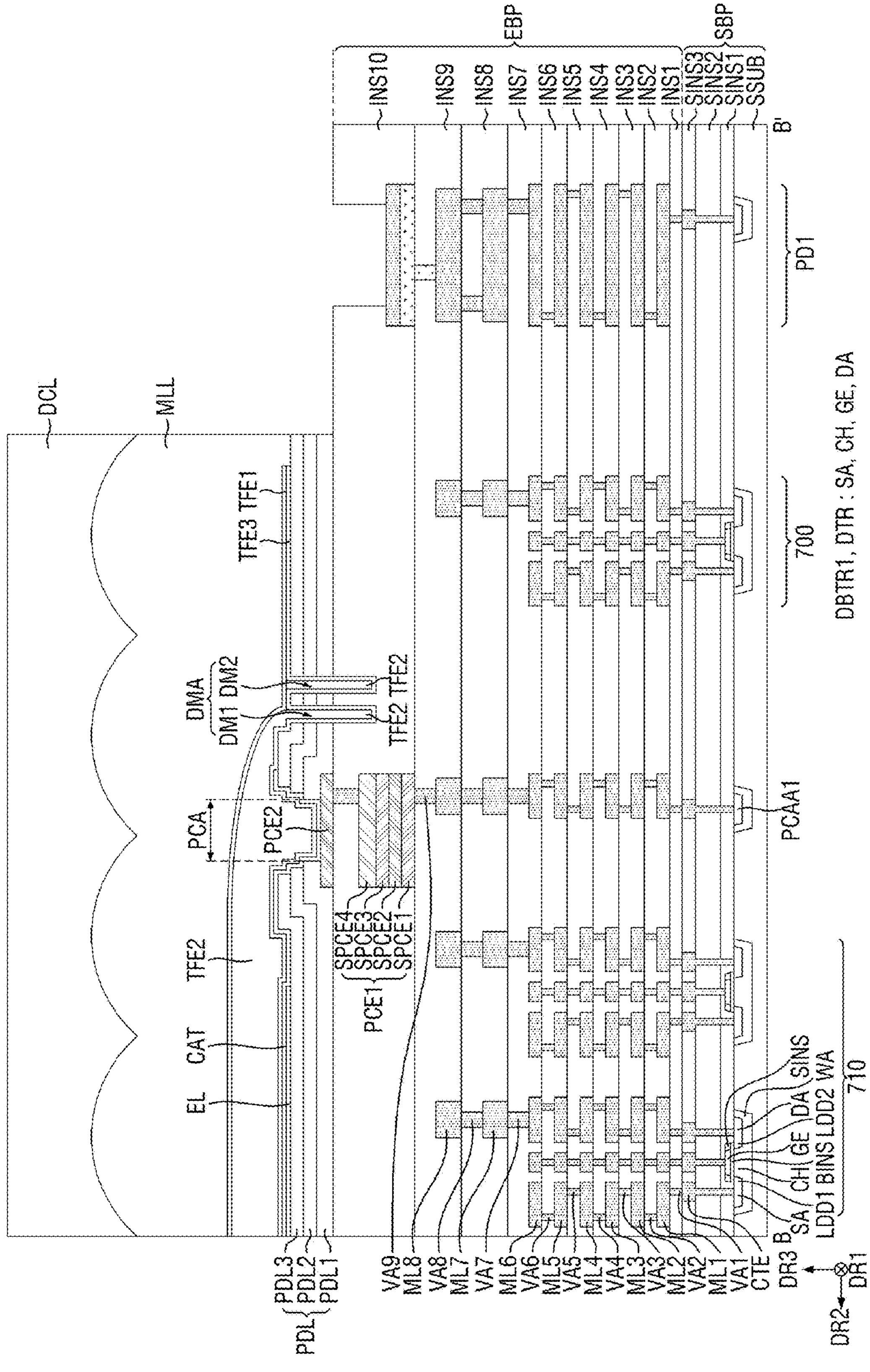
FIG. 9 is a schematic cross-sectional view taken along the line B-B' of FIG. 8.

FIG. 8 is an enlarged view of area X of FIG. 4. FIG. 9 is a schematic cross-sectional view taken along the line B-B' of FIG. 8.

Area X of FIG. 4 may be an area located on the lower side of the display area DAA (e.g., in plan view), which is one side of the display area DAA in the second direction DR2. In FIGS. 8 and 9, the first distribution circuit 710, the power connection part PCA, the dam DAM, the data driver 700, and the first pad PD1 located on the lower side of the display area DAA are illustrated.

Referring to FIGS. 8 and 9, on the lower side of the display area DAA, the first distribution circuit 710, the power connection part PCA, the dam DAM, the data driver 700, and the first pad PD1 may be sequentially located in the second direction DR2. However, the present disclosure is not limited thereto. In some embodiments, the power connection part PCA may overlap the first distribution circuit 710 or the data driver 700 in the thickness direction, and the dam DAM may overlap the first distribution circuit 710 or the data driver 700 in the thickness direction.

The first distribution circuit 710 may include a plurality of first distribution transistors DBTR1. Each of the plurality of first distribution transistors DBTR1 may be formed substantially the same as the pixel transistors PTR described with reference to FIG. 7, and a repeated detailed description of the plurality of first distribution transistors DBTR1 is thus omitted. In addition, first to eighth metal layers ML1, ML2, ML3, ML4, ML5, ML6, ML7, and ML8 and first to eighth vias VA1, VA2, VA3, VA4, VA5, VA6, VA7, and VA8 electrically connected to the plurality of first distribution transistors DBTR1 are also substantially the same as those described with reference to FIG. 7, and a repeated detailed description thereof is thus omitted.

The power connection part PCA includes a first power connection area PCAA1 of the semiconductor substrate SSUB, a first power connection electrode PCE1, and a second power connection electrode PCE2.

The first driving voltage VSS may be applied to the first power connection area PCAA1 of the semiconductor substrate SSUB.

The first power connection electrode PCE1 may be located on the ninth interlayer insulating film INS9. The first power connection electrode PCE1 may be connected to the first power connection area PCAA1 of the semiconductor substrate SSUB through the first to eighth metal layers ML1, ML2, ML3, ML4, ML5, ML6, ML7, and ML8 and the first to eighth vias VA1, VA2, VA3, VA4, VA5, VA6, VA7, and VA8.

The first power connection electrode PCE1 may include first to fourth sub-power connection electrodes SPCE1, SPCE2, SPCE3, and SPCE4. The first to fourth sub-power connection electrodes SPCE1, SPCE2, SPCE3, and SPCE4 of the first power connection electrode PCE1 may be substantially the same as the first to fourth reflective electrodes RL1, RL2, RL3, and RL4 of the reflective electrode layer RL. That is, the first sub-power connection electrode SPCE1 may correspond to the first reflective electrode RL1, the second sub-power connection electrode SPCE2 may correspond to the second reflective electrode RL2, the third sub-power connection electrode SPCE3 may correspond to the third reflective electrode RL3, and the fourth sub-power connection electrode SPCE4 may correspond to the fourth reflective electrode RL4.

The second power connection electrode PCE2 may be located on the tenth interlayer insulating film INS10. The second power connection electrode PCE2 may be connected to the first power connection electrode PCE1 through the via. The second power connection electrode PCE2 may include substantially the same material as the first electrode AND of the light-emitting element LE. The second power connection electrode PCE2 may be partitioned by the pixel-defining film PDL. The second electrode CAT of the light-emitting element LE may be connected to the second power connection electrode PCE2 exposed without being covered by the pixel-defining film PDL.

The dam DAM may include a first sub-dam DM1 and a second sub-dam DM2. The first sub-dam DM1 and the second sub-dam DM2 may be substantially the same as the trenches TRC. Each of the first sub-dam DM1 and the second sub-dam DM2 may penetrate through the first pixel-defining film PDL1, the second pixel-defining film PDL2, and the third pixel-defining film PDL3. In each of the first sub-dam DM1 and the second sub-dam DM2, a portion of the tenth interlayer insulating film INS10 may be trenched.

In each of the first sub-dam DM1 and the second sub-dam DM2, the first encapsulation inorganic film TFE1 may be located on a bottom surface. The encapsulation organic film TFE2 may be located on the first encapsulation inorganic film TFE1. The second encapsulation inorganic film TFE3 may be located on the encapsulation organic film TFE2. The encapsulation organic film TFE2 may fill a portion of each of the first sub-dam DM1 and the second sub-dam DM2. Alternatively, the encapsulation organic film TFE2 may not be located in each of the first sub-dam DM1 and the second sub-dam DM2. That is, the first encapsulation inorganic film TFE1 and the second encapsulation inorganic film TFE3 may be located in each of the first sub-dam DM1 and the second sub-dam DM2.

Due to the first sub-dam DM1 and the second sub-dam DM2, it is possible to reduce or prevent the likelihood of the encapsulation organic film TFE2 flowing to the first pad part PDA1 to cover the first pads PD1. When the encapsulation organic film TFE2 covers the first pads PD1, the first pads PD1 may not be electrically connected to the circuit board 300.

The data driver 700 may include a plurality of data transistors DTR. Each of the plurality of data transistors DTR may be formed substantially the same as the pixel transistors PTR described with reference to FIG. 7, and a repeated detailed description of the plurality of data transistors DTR is thus omitted. In addition, first to eighth metal layers ML1, ML2, ML3, ML4, ML5, ML6, ML7, and ML8 and first to eighth vias VA1, VA2, VA3, VA4, VA5, VA6, VA7, and VA8 electrically connected to the plurality of data transistors DTR are also substantially the same as those described with reference to FIG. 7, and a repeated detailed description thereof is thus omitted.

Each of the first pads PD1 may include a pad metal layer PML. The pad metal layer PML may include a first sub-pad metal layer SPML1 and a second sub-pad metal layer SPML2. The first sub-pad metal layer SPML1 may include any one of copper (Cu), aluminum (Al), tungsten (W), molybdenum (Mo), chromium (Cr), gold (Au), titanium (Ti), nickel (Ni), and neodymium (Nd), or alloys thereof. The second sub-pad metal layer SPML2 may be made of any one of copper (Cu), aluminum (Al), tungsten (W), molybdenum (Mo), chromium (Cr), gold (Au), titanium (Ti), nickel (Ni), or neodymium (Nd), or alloys thereof. For example, the first sub-pad metal layer SPML1 may be made of aluminum (Al), and may have a thickness of approximately 12,000 Å. In addition, the second sub-pad metal layer SPML2 may be made of titanium nitride (TIN), and may have a thickness of approximately 600 Å. A thickness of the pad metal layer PML may be greater than a thickness of the reflective electrode layer RL.

A portion of an upper surface of the pad metal layer PML of the first pads PD1 may be exposed without being covered by the tenth interlayer insulating film INS10. The first sub-pad metal layer SPML1 may be connected to a pad via penetrating through the ninth interlayer insulating film INS9 to be connected to the eighth metal layer ML8.

Meanwhile, the encapsulation layer TFE, the lens array layer MLL, and the cover layer DCL may also be located in a portion of the non-display area NDA positioned on the lower side of the display area DAA. The encapsulation organic film TFE2 of the encapsulation layer TFE may be located up to an inner side of the dam DAM, while the encapsulation inorganic films TFE1 and TFE3 of the encapsulation layer TFE may be located up to (e.g., past) an outer side of the dam DAM to form an inorganic bonding area. Each of the lens array layer MLL and the cover layer DCL may be located up to (e.g., past) an outer side of the encapsulation inorganic films TFE1 and TFE3 of the encapsulation layer TFE. The lens array layer MLL may correspond to an area where the cover layer DCL is formed, and may be located up to the non-display area NDA beyond the display area DAA so that the cover layer DCL may completely cover the display area DAA. In one or more embodiments, the lens array layer MLL may also be partially located in the non-display area NDA positioned on the upper side of the display area DAA.

Figure 10:
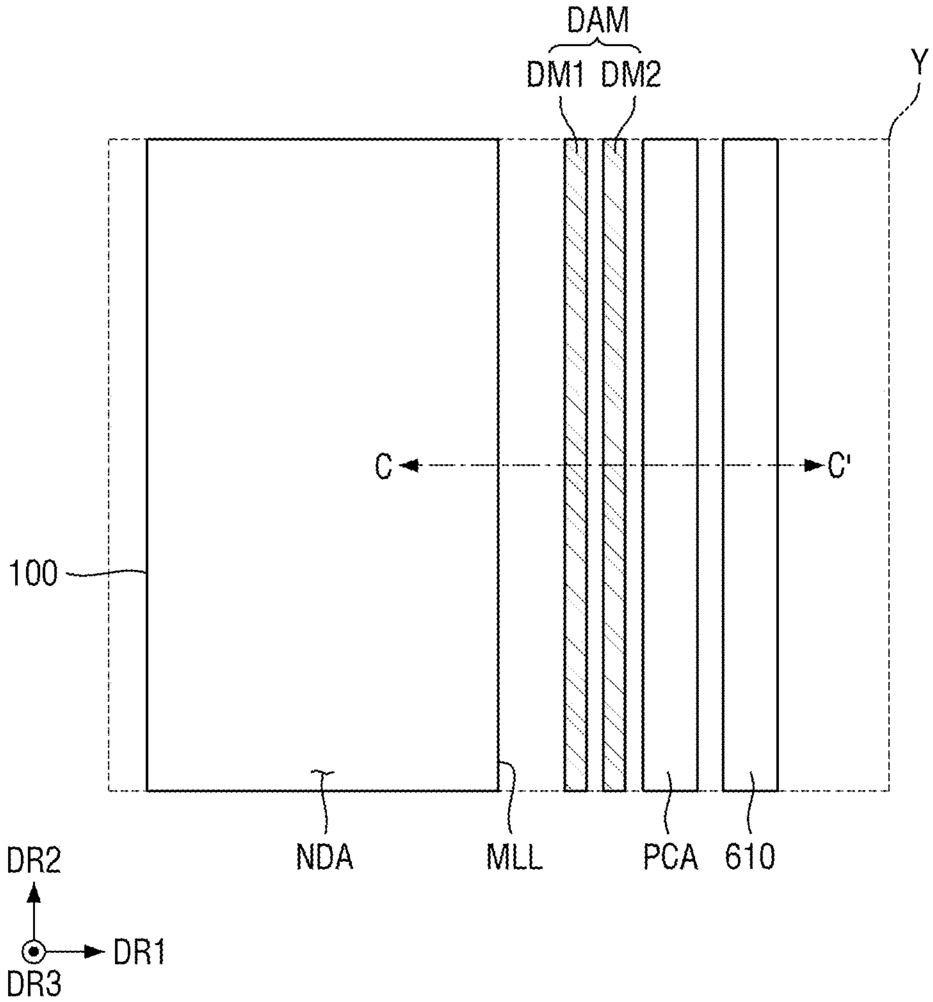
FIG. 10 is an enlarged view of area Y of FIG. 4.
Figure 11:
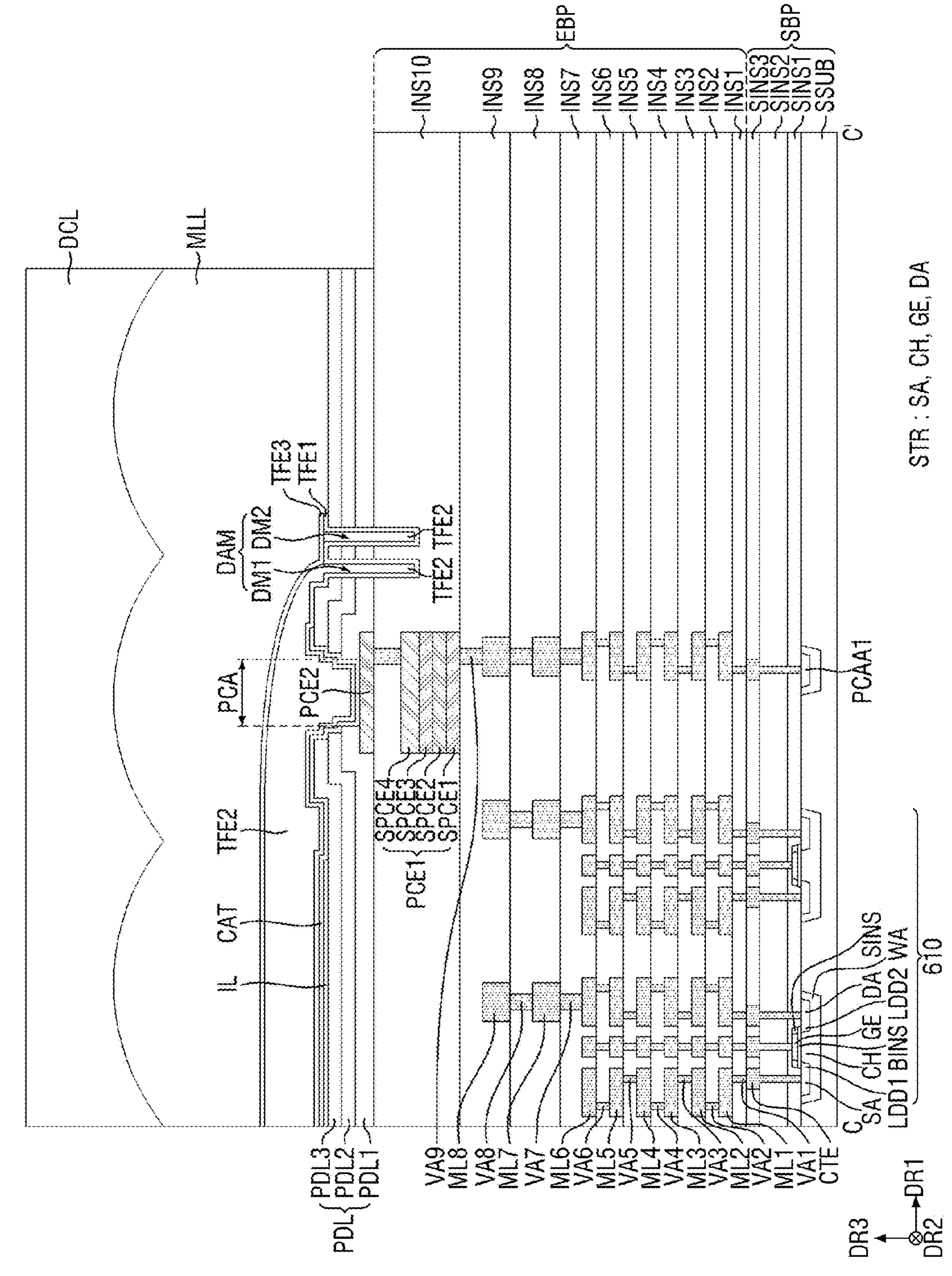
FIG. 11 is a schematic cross-sectional view taken along the line C-C' of FIG. 10.

FIG. 10 is an enlarged view of area Y of FIG. 4. FIG. 11 is a schematic cross-sectional view taken along the line C-C' of FIG. 10.

Area Y of FIG. 4 may be an area located on the left side of the display area DAA, which is one side of the display area DAA in the first direction DR1. In FIGS. 10 and 11, the scan driver 610, the power connection part PCA, and the dam DAM located on the left side of the display area DAA are illustrated.

Referring to FIGS. 10 and 11, on the left side of the display area DAA, the scan driver 610, the power connection part PCA, and the dam DAM may be sequentially located in the first direction DR1. However, the present disclosure is not limited thereto, and the power connection part PCA may overlap the scan driver 610 in the thickness direction, and the dam DAM may overlap the scan driver 610 in the thickness direction.

The scan driver 610 may include a plurality of scan transistors STR. Each of the plurality of scan transistors STR may be formed substantially the same as the pixel transistors PTR described with reference to FIG. 7, and a repeated detailed description of the plurality of scan transistors STR is thus omitted. In addition, first to eighth metal layers ML1, ML2, ML3, ML4, ML5, ML6, ML7, and ML8 and first to eighth vias VA1, VA2, VA3, VA4, VA5, VA6, VA7, and VA8 electrically connected to the plurality of scan transistors STR are also substantially the same as those described with reference to FIG. 7, and a repeated detailed description thereof is thus omitted.

The power connection part PCA and the dam DAM are substantially the same as those described with reference to FIGS. 8 and 9, and a repeated detailed description thereof is thus omitted.

In addition, an area located on the second side of the display area DAA is substantially the same as that illustrated in FIGS. 10 and 11 except that the scan driver 610 is replaced with the emission driver 620, and a description thereof is thus omitted.

Meanwhile, the encapsulation layer TFE, the lens array layer MLL, and the cover layer DCL may also be located in a portion of the non-display area NDA positioned on the left side of the display area DAA. The encapsulation organic film TFE2 of the encapsulation layer TFE may be located up to an inner side of the dam DAM, while the encapsulation inorganic films TFE1 and TFE3 of the encapsulation layer TFE may be located up to (e.g., past) an outer side of the dam DAM to form an inorganic bonding area. Each of the lens array layer MLL and the cover layer DCL may be located up to (e.g., past) an outer side of the encapsulation inorganic films TFE1 and TFE3 of the encapsulation layer TFE. The lens array layer MLL may correspond to an area where the cover layer DCL is formed, and may be located up to the non-display area NDA beyond the display area DAA so that the cover layer DCL may completely cover the display area DAA. In one or more embodiments, the lens array layer MLL may also be partially located in the non-display area NDA positioned on the left side of the display area DAA.

Figure 12:
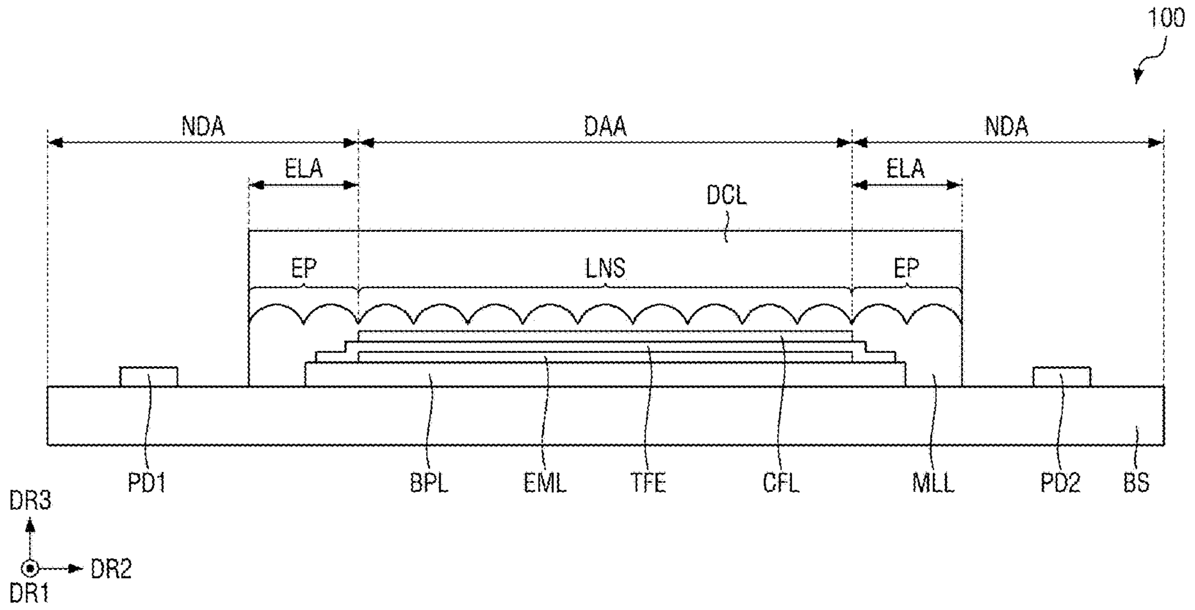
FIG. 12 is a schematic cross-sectional view, taken in a second direction, of the display panel according to one or more embodiments.

FIG. 12 is a schematic cross-sectional view, taken in a second direction, of the display panel according to one or more embodiments.

Referring to FIG. 12, the display device 10 may include the lens array layer MLL located on a base substrate BS of the display panel 100. The display device 10 may include a backplane layer BPL, the display element layer EML, the encapsulation layer TFE, and the color filter layer CFL located on the base substrate BS of the display panel 100. The base substrate BS and the backplane layer BPL may include the semiconductor backplane SBP and the light-emitting element backplane EBP described above with reference to FIG. 7. A description thereof is the same as that described above, and a repeated detailed description is thus omitted.

The lens array layer MLL may be located in a portion of the non-display area NDA around the display area DAA in addition to the display area DAA. The plurality of lenses LNS located in the display area DAA may increase a ratio of light emitted to a front surface of the display device 10.

According to one or more embodiments, the lens array layer MLL may include the lenses LNS formed over the entire display area DAA and a plurality of pattern portions EP formed to surround the lenses LNS in the non-display area NDA around the display area DAA. The lens array layer MLL may be located in a portion of the non-display area NDA in addition to the display area DAA, the lenses LNS of the lens array layer MLL may be located in the display area DAA, and the pattern portions EP of the lens array layer MLL may be located in the non-display area NDA. A pattern area ELA, where the pattern portions EP of the lens array layer MLL are formed, may be positioned in the non-display area NDA. However, the lens array layer MLL might not completely cover the non-display area NDA, and may expose the pads PD1 and PD2, and thus, the pattern portions EP may overlap the backplane layer BPL located in the non-display area NDA, but may not overlap the pads PD1 and PD2. The pattern portions EP may be patterns located in the non-display area NDA rather than the display area DAA to be unrelated to a role of increasing the ratio of the light emitted to the front surface of the display device 10.

However, the pattern portions EP of the lens array layer MLL may form a high surface roughness of the lens array layer MLL together with the plurality of lenses LNS, and may form an area where the cover layer DCL is located thereon. The lenses LNS of the lens array layer MLL may be formed over the entire display area DAA, and may form fine patterns arranged in a matrix form. Similarly, the pattern portions EP of the lens array layer MLL may be located in the non-display area NDA around the display area DAA, and may form fine patterns arranged in a matrix form, similar to the lenses LNS. Accordingly, the lens array layer MLL may have a higher surface roughness than a flat surface, and may have excellent wettability characteristics. When an organic material is applied onto the lens array layer MLL, the organic material may be self-aligned at a boundary of an area where the fine patterns of the lens array layer MLL are formed. That is, the display panel 100 may include the lens array layer MLL located therein to reduce or prevent the likelihood of the organic material overflowing even without a separate dam structure. In the display device 10, the cover layer DCL may be formed using the surface roughness of the lens array layer MLL when it is formed, and the separate dam structure may be omitted, such that an area of the non-display area NDA may be reduced or minimized. Furthermore, a large number of display panels 100 may be fabricated per unit area of a wafer substrate, such that a fabrication yield may be improved.

A shape of the pattern portions EP of the lens array layer MLL that are located in the non-display area NDA is not particularly limited as long as the pattern portions EP may form the surface roughness, similar to the lenses LNS. According to one or more embodiments, the lens array layer MLL of the display device 10 may include the lenses LNS having a shape convex in the upward direction and the pattern portions EP having the same shape as the lenses LNS. The lens array layer MLL may form uniform fine patterns depending on positions while being located over the display area DAA and a portion of the non-display area NDA. When the organic material is applied onto the lens array layer MLL, the organic material may be self-aligned at an edge boundary of the lens array layer MLL regardless of the positions. When the organic material is cured to form the cover layer DCL, the cover layer DCL may overlap the display area DAA and a portion of the non-display area NDA. Accordingly, the cover layer DCL may completely cover at least the display area DAA.

FIG. 12 illustrates one or more embodiments in which the pattern portions EP of the lens array layer MLL have the same structure as the lenses LNS of the display area DAA, but the present disclosure is not limited thereto. In some embodiments, the pattern portion EP of the lens array layer MLL may also have a structure other than a convexly protruding shape. The will be described later with reference to other drawings.

Hereinafter, fabricating processes of the display device 10 will be described with reference to other drawings.

FIGS. 13 to 21 are views sequentially illustrating fabricating processes of the display device according to one or more embodiments.

A method of fabricating the display device 10 according to one or more embodiments may include forming a lens array layer MLL on a display element layer EML of a display panel 100, forming a resin layer on the lens array layer MLL, planarizing an upper surface of the resin layer, and forming a cover layer DCL by curing the resin layer. In the forming of the resin layer, when the resin layer is applied onto the lens array layer MLL, the resin layer may be self-aligned with the lens array layer MLL and may not overflow to the outside of the lens array layer MLL. Accordingly, in the fabricating processes of the display device 10, a separate member for reducing or preventing the likelihood of the overflow of the resin layer is omitted, such that the non-display area NDA may be reduced or minimized.

Figure 13:
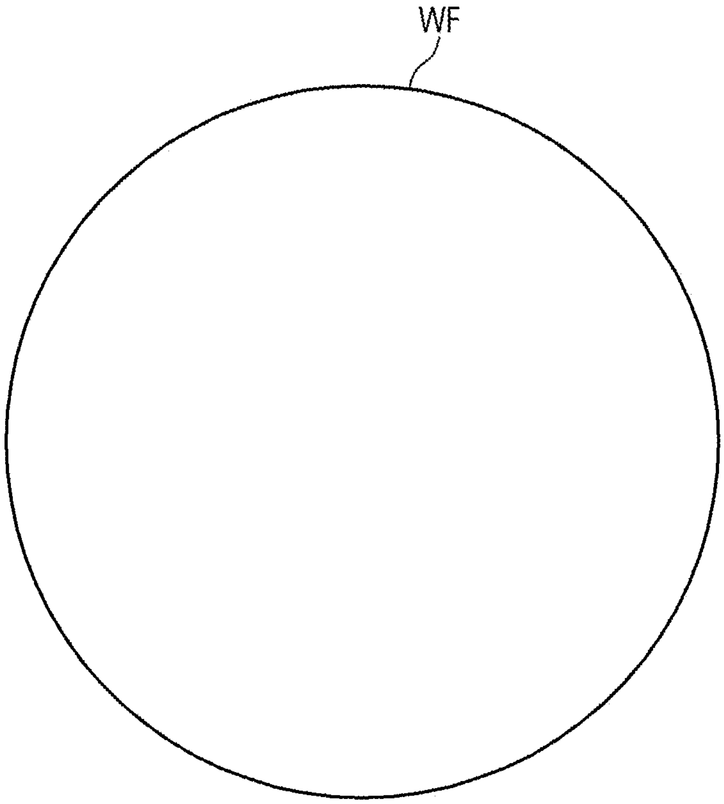
FIGS. 13 to 21 are views sequentially illustrating fabricating processes of the display device according to one or more embodiments.
Figure 14:
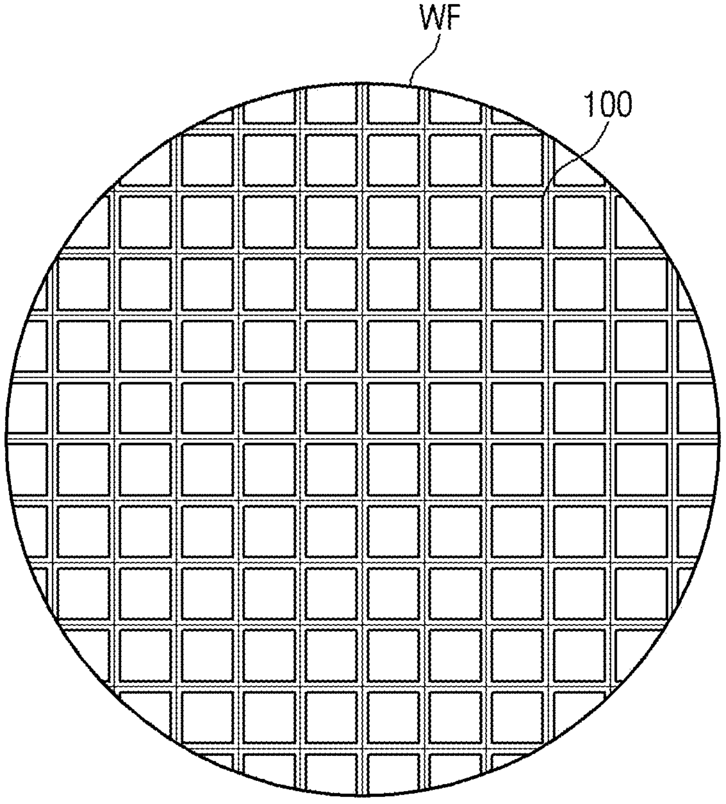

First, referring to FIGS. 13 and 14, a wafer substrate WF is prepared, and backplanes SBP and EBP, a display element layer EML, an encapsulation layer TFE, a color filter layer CFL, and the like, are formed on the wafer substrate WF to form a display panel 100. The wafer substrate WF may be a silicon substrate, a germanium substrate, or a silicon-germanium substrate. The wafer substrate WF may be a substrate doped with first-type impurities, and may be a mother substrate of the semiconductor substrate SSUB of the display panel 100.

A plurality of transistors (e.g., pixel transistors PTR) are formed on one surface of the wafer substrate WF, and the backplanes SBP and EBP, the display element layer EML, the encapsulation layer TFE, the color filter layer CFL, and the like, are formed to form the display panel 100. A process of forming the plurality of transistors on the wafer substrate WF may be a micro-semiconductor process. The backplanes SBP and EBP may be formed through a micro-semiconductor process. The display element layer EML, the encapsulation layer TFE, and the color filter layer CFL may be then formed. The display element layer EML, the encapsulation layer TFE, and the color filter layer CFL may be formed through a general process.

Figure 15:
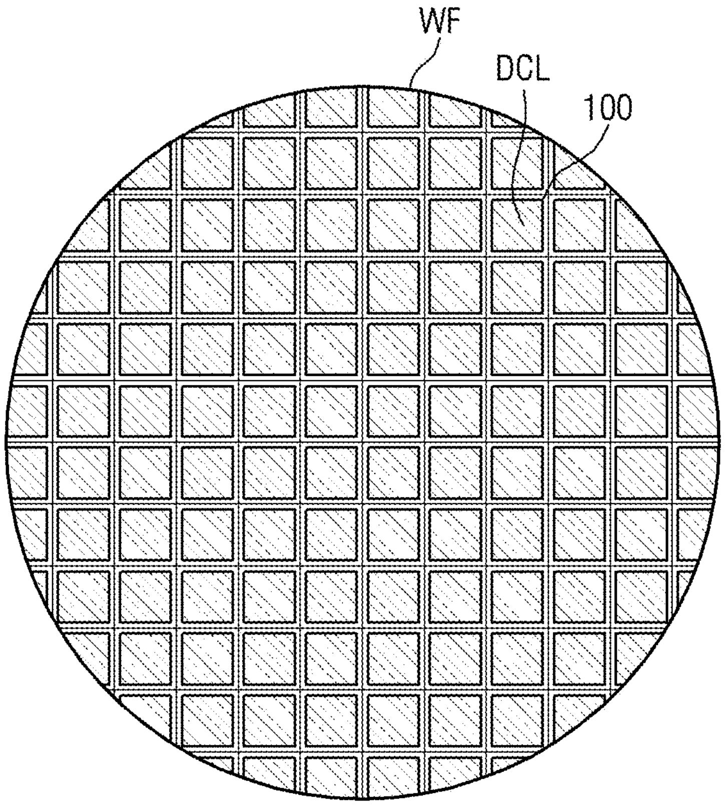

Subsequently, referring to FIG. 15, the lens array layer MLL and the cover layer DCL are formed on the display element layer EML of the display panel 100. In one or more embodiments, a process of forming the lens array layer MLL may be performed through an imprint process for applying an organic insulating material, and for forming a plurality of lenses LNS and pattern portions EP. A process of forming the cover layer DCL may be performed through a process of applying an organic material onto the lens array layer MLL, and then planarizing and curing the organic material.

Figure 16:
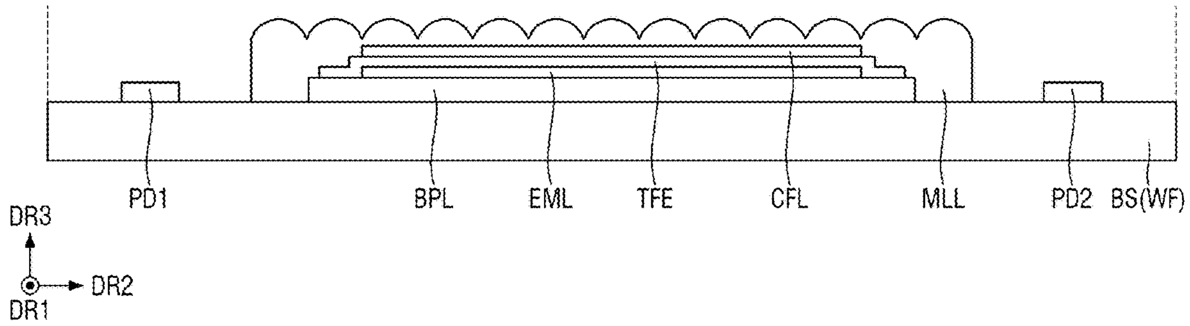
Figure 17:
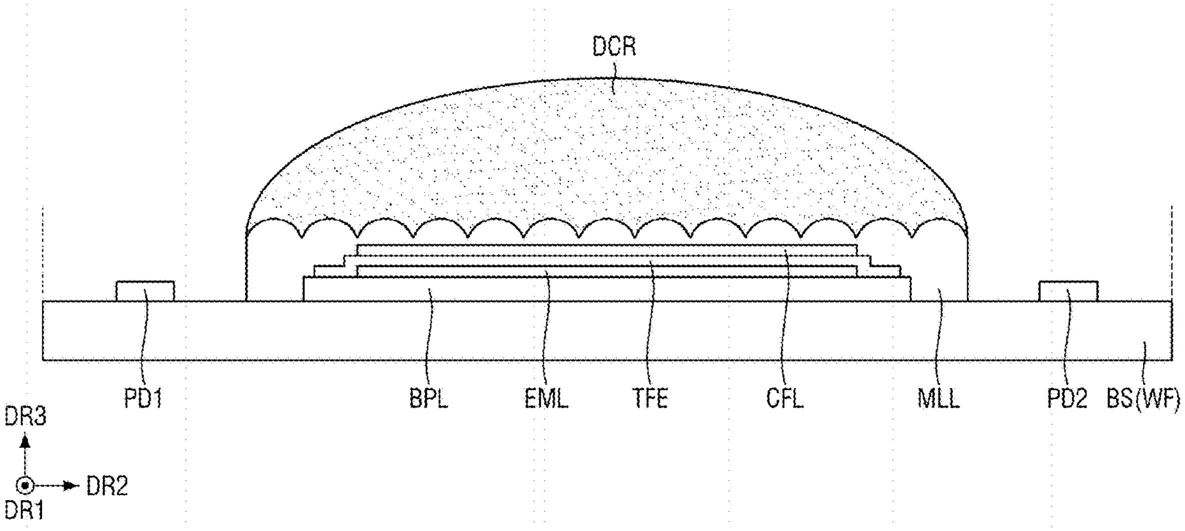

Referring to FIGS. 16 and 17, the lens array layer MLL is formed on the wafer substrate WF on which the display element layer EML and the like are formed. The lens array layer MLL may include a plurality of lenses LNS corresponding to the display area DAA or the display element layer EML, and may include pattern portions EP located in the non-display area NDA around the display area DAA. The pattern portions EP may have a cross-sectional shape convex in the upward direction like the lenses LNS, and the lens array layer MLL may have fine patterns formed over the display area DAA and a portion of the non-display area NDA of the display panel 100. The lens array layer MLL may have a high surface roughness and improved wetting characteristics. In the display panel 100, an upper surface of the lens array layer MLL may have higher surface energy than other areas.

When the lens array layer MLL is formed, a resin layer DCR forming the cover layer DCL is applied onto the lens array layer MLL. When the resin layer DCR is applied to the lens array layer MLL, the resin layer DCR may be spread to the display area DAA and the outside of the display area DAA, and then may be self-aligned at the outermost boundary of the lens array layer MLL. The resin layer DCR may be entirely applied to the lens array layer MLL having the high surface energy, but may not overflow to the outside of the lens array layer MLL. In one or more embodiments, the resin layer DCR may include a hydrophilic organic material, and may be self-aligned with the lens array layer MLL having the high surface energy. In the display device 10, a shape or an area, in plan view, of the cover layer DCL located on the lens array layer MLL may be changed depending on a shape or an area of the lens array layer MLL in plan view.

In addition, an entire shape, a thickness, or the like, of the cover layer DCL may be controlled by adjusting an amount of the applied resin layer DCR. Because the area of the cover layer DCL in plan view may be substantially the same as the area of the lens array layer MLL, the thickness of the cover layer DCL may be adjusted through the amount of the applied resin layer DCR and the area of the lens array layer MLL.

Figure 18:
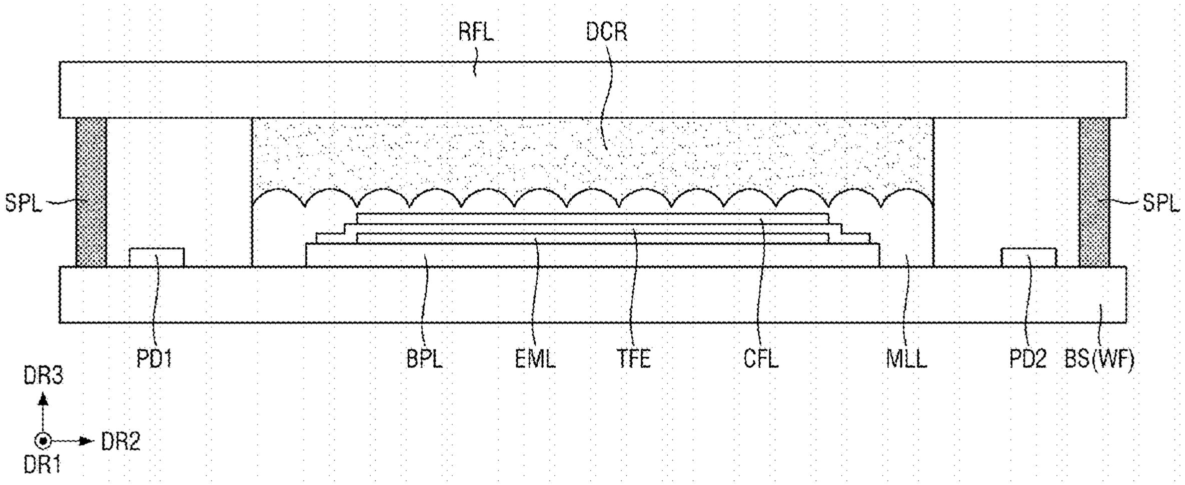

Subsequently, referring to FIG. 18, a spacer SPL is located at the outermost portion of the display panel 100 or an outer portion of the wafer substrate WF, and a release film RFL is attached onto the spacer SPL to planarize an upper surface of the resin layer DCR. A height or a thickness of the resin layer DCR may be controlled by adjusting a height of the spacer SPL. The release film RFL may planarize the upper surface of the resin layer DCR, and the cover layer DCL formed by curing the resin layer DCR may have a smooth upper surface.

In some embodiments, one surface of the release film RFL in contact with the resin layer DCR may be surface-treated or coated. The release film RFL may have a surface allowing the resin layer DCR not to be spread and not to overflow from the lens array layer MLL, even in a process of planarizing the resin layer DCR. The surface of the release film RFL may be subjected to hydrophilic or hydrophobic surface treatment depending on physical properties of the resin layer DCR. For example, in one or more embodiments in which the resin layer DCR includes a hydrophilic organic material, and in which the lens array layer MLL is made of a hydrophilic material, a lower surface of the release film RFL in contact with the resin layer DCR may be subjected to hydrophobic surface treatment. However, the present disclosure is not limited thereto.

Figure 19:
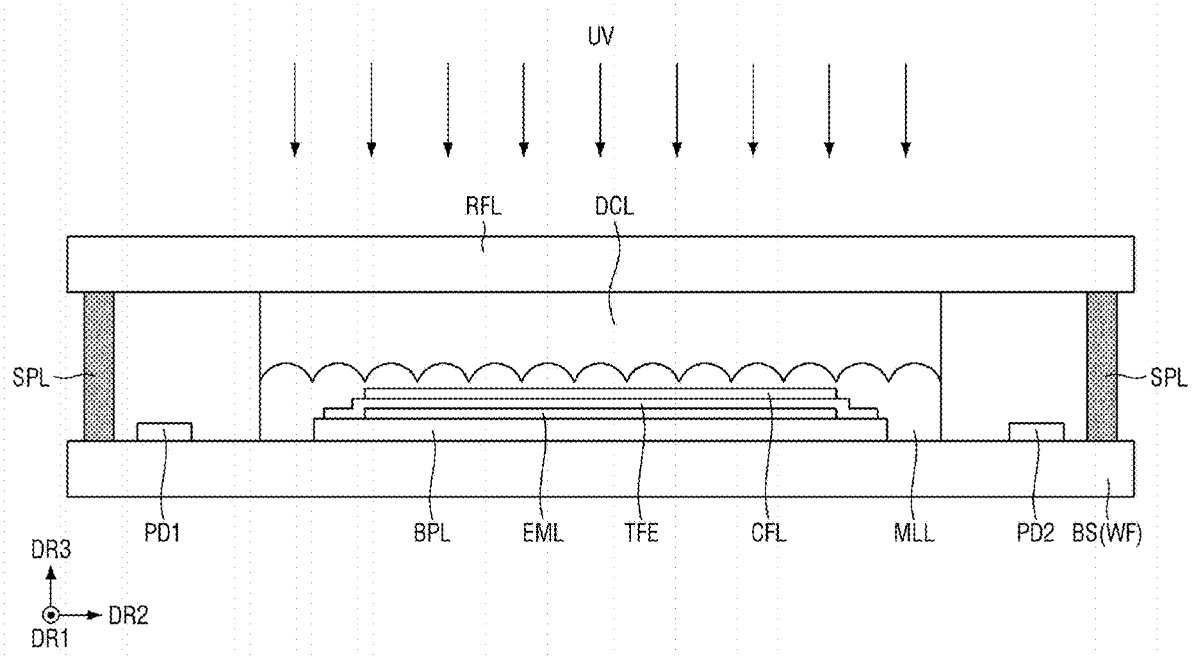
Figure 20:
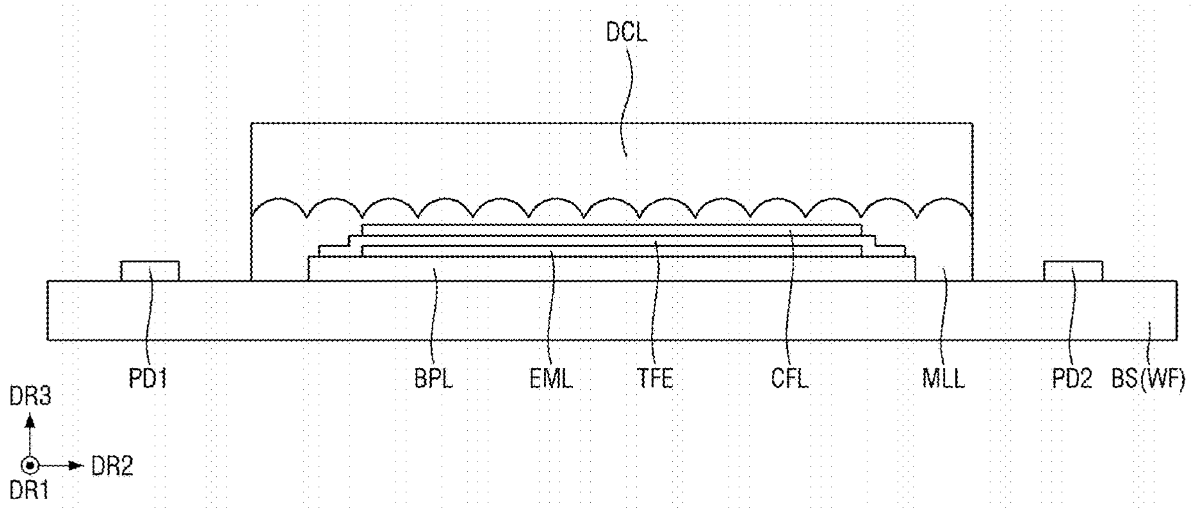

Subsequently, referring to FIGS. 19 and 20, the resin layer DCR is cured by ultraviolet (UV) irradiation or heat treatment to form the cover layer DCL, and the spacer SPL and the release film RFL are removed. Because the resin layer DCR is cured in a state in which the release film RFL is attached to the resin layer DCR, the resin layer DCR may be cured in an area where it does not go beyond the lens array layer MLL, and the upper surface of the resin layer DCR may be planarized. In addition, the release film RFL and the spacer SPL may be completely removed, and the cover layer DCL may remain in the display panel 100.

Figure 21:
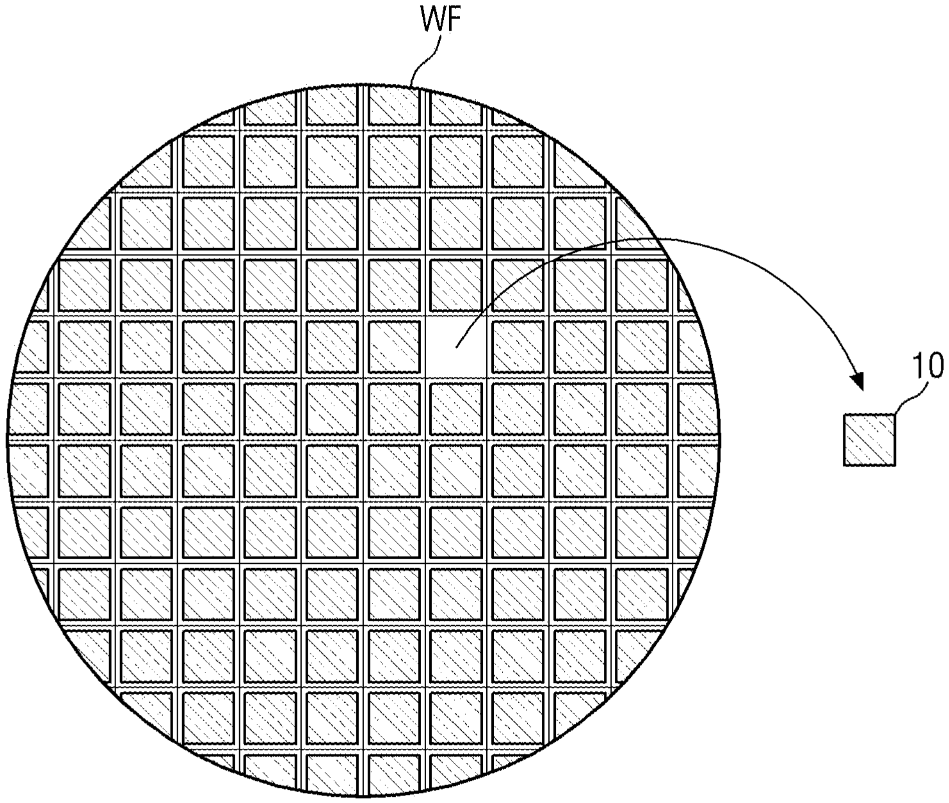

Subsequently, referring to FIG. 21, the display panel 100 is formed by dividing the wafer substrate WF, and the display device 10 is fabricated by attaching the circuit board 300 to the display panel 100.

The method of fabricating the display device 10 according to one or more embodiments may include a process of disposing the lens array layer MLL over the display area DAA and a portion of the non-display area NDA of the display panel 100, and then applying the resin layer DCR, and may form the resin layer DCR at only a corresponding area even without a separate structure reducing or preventing the likelihood of the overflow of the resin layer DCR. The cover layer DCL formed by curing the resin layer DCR may completely cover the display area DAA along the shape of the lens array layer MLL in plan view while having a flat upper surface. In addition, because the display device 10 does not require the separate structure during the fabricating processes, a space of the non-display area NDA may be reduced, and a large number of display panels 100 may be fabricated per unit wafer substrate WF, such that a fabrication yield may be improved.

Hereinafter, various embodiments of the display device 10 will be described with reference to other drawings.

Figure 22:
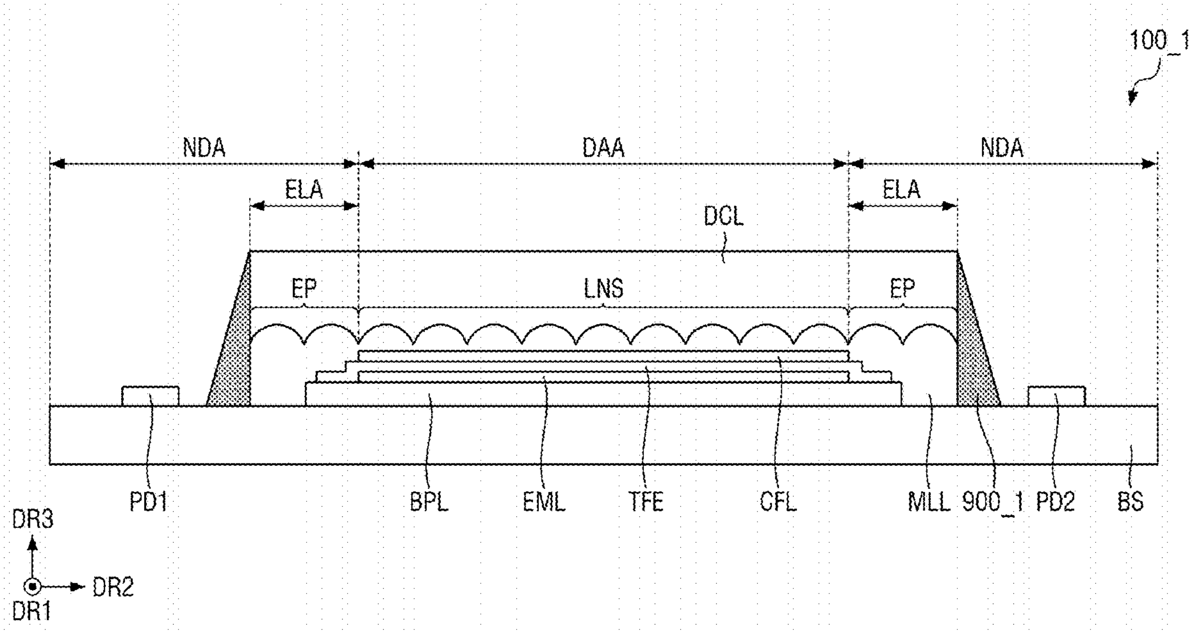
FIG. 22 is a schematic cross-sectional view, taken in a second direction, of a display panel of a display device according to one or more other embodiments.

FIG. 22 is a schematic cross-sectional view, taken in a second direction, of a display panel of a display device according to one or more other embodiments.

Referring to FIG. 22, a display device 10 according to one or more other embodiments may further include a light-blocking member 900_1 located in a display panel 100_1. The light-blocking member 900_1 may be located on side surfaces of the lens array layer MLL and the cover layer DCL. For example, the light-blocking member 900_1 may surround the side surfaces of the lens array layer MLL and the cover layer DCL in the non-display area NDA. In some embodiments, the light-blocking member 900_1 may include a material for blocking transmission of light, and may reduce or prevent leakage of light emitted from the display element layer EML to the side surfaces of the lens array layer MLL.

Because the lens array layer MLL includes the pattern portions EP located in the pattern area ELA of the non-display area NDA, and because the pattern portions EP have substantially the same shape as the lenses LNS, when the light emitted from the display element layer EML is incident on the pattern portions EP, the light may be emitted while being spread. The display device 10 may further include the light-blocking member 900_1 to reduce or prevent the light from leaking to the side surfaces of the lens array layer MLL. In addition, the light-blocking member 900_1 is further located, and accordingly, permeation of external air may be further reduced or prevented.

Figure 23:
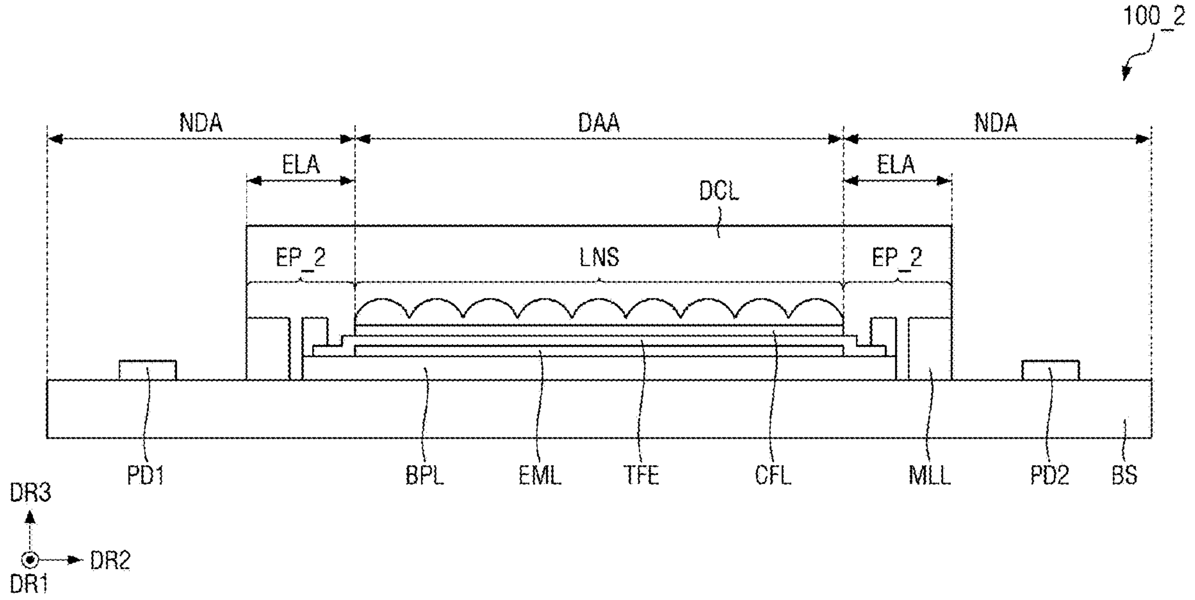
FIG. 23 is a schematic cross-sectional view, taken in a second direction, of a display panel of a display device according to one or more other embodiments.
Figure 24:
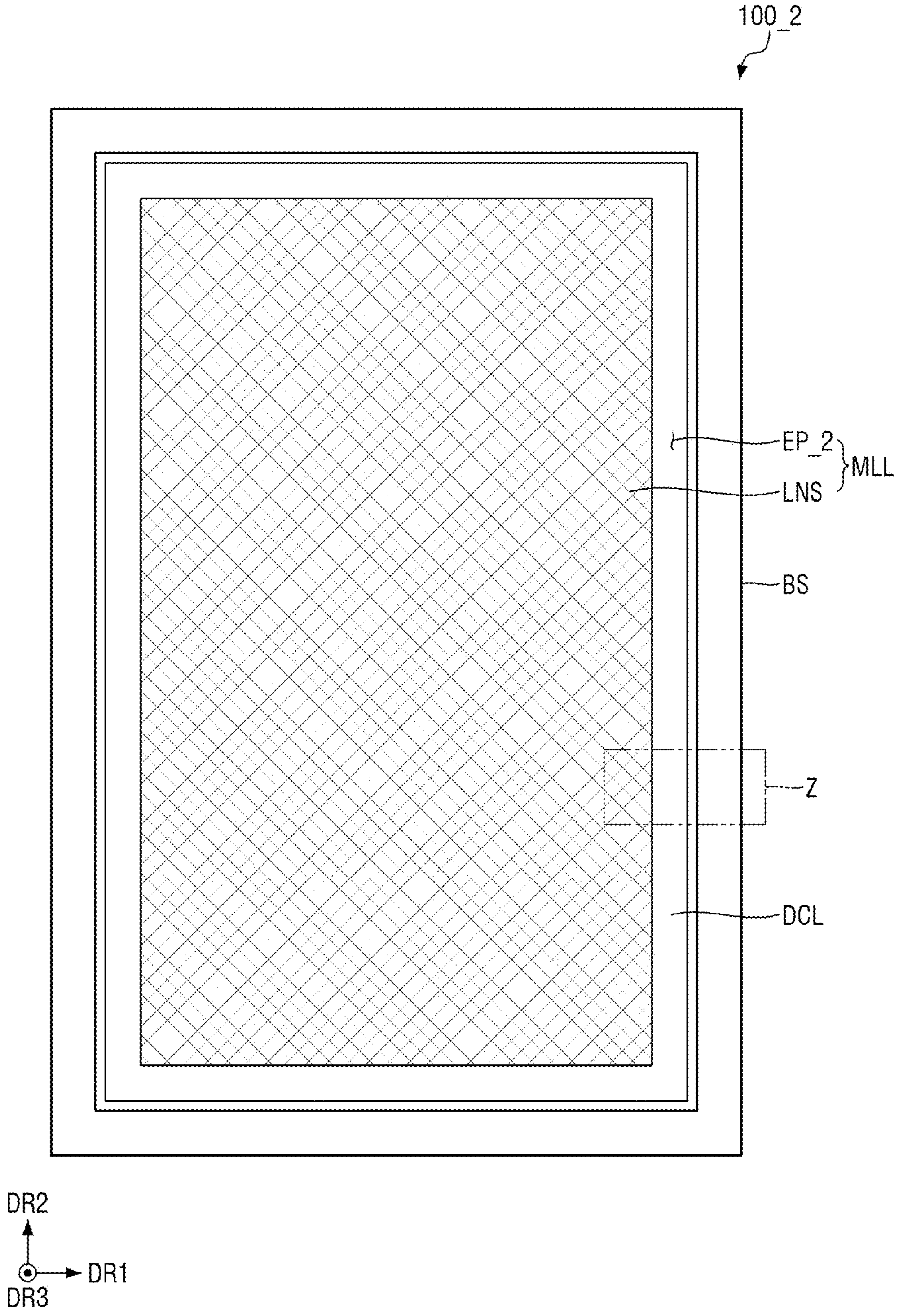
FIG. 24 is a schematic plan view of the display panel of FIG. 23.

FIG. 23 is a schematic cross-sectional view, taken in a second direction, of a display panel of a display device according to one or more other embodiments. FIG. 24 is a schematic plan view of the display panel of FIG. 23.

Referring to FIGS. 23 and 24, in a display panel 100_2 of a display device 10 according to one or more other embodiments, the lens array layer MLL may include a plurality of pattern portions EP_2 located in the non-display area NDA, and the pattern portion EP_2 may have a different shape from the lens LNS located in the display area DAA. A shape of the pattern portion EP_2 may be variously changed as long as the pattern portion EP_2 may surround the display area DAA in the non-display area NDA, and may reduce or prevent spreading of the resin layer DCR applied onto the lens array layer MLL.

Figure 25:
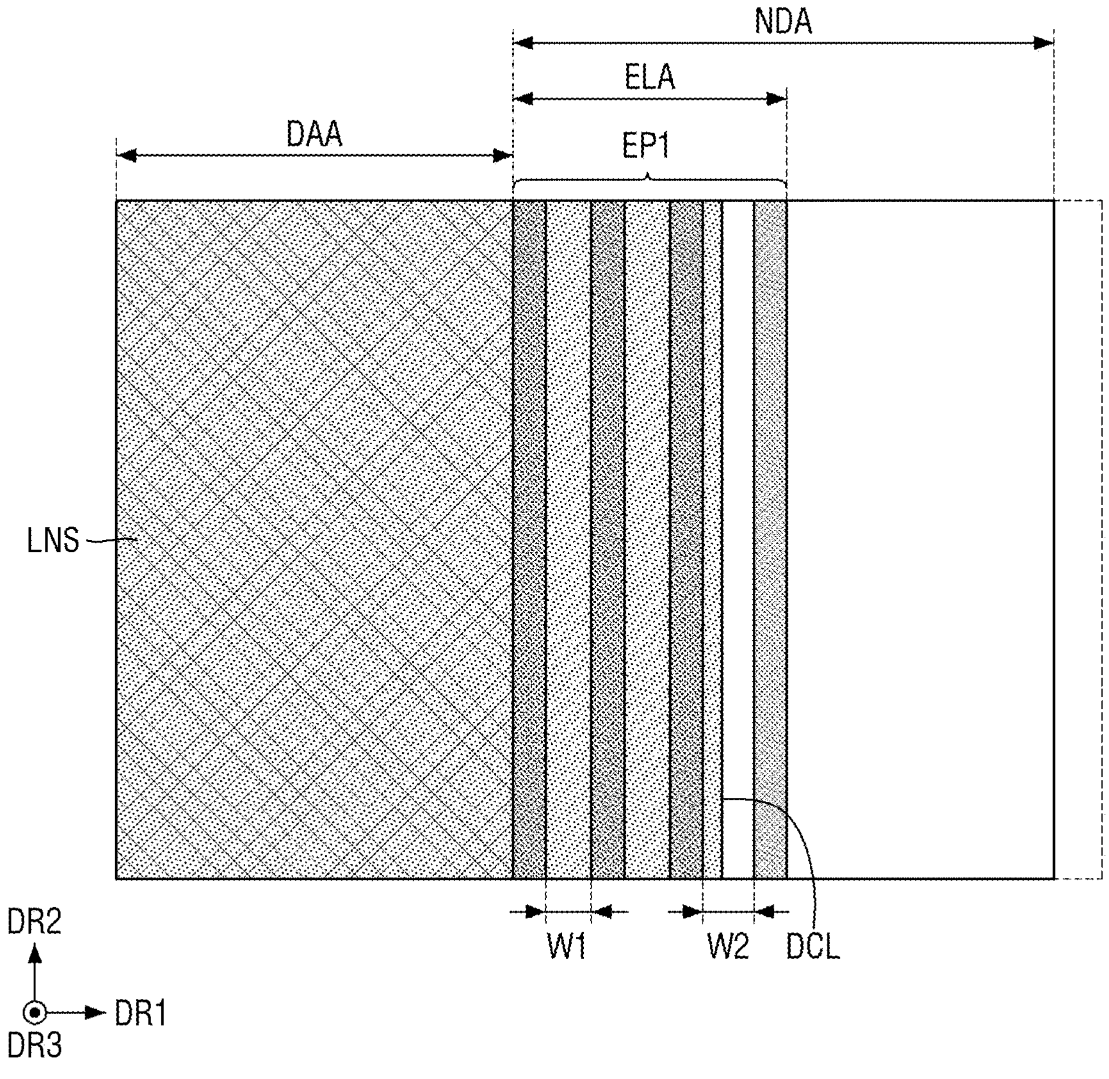
FIG. 25 is a plan view illustrating an example of area Z of FIG. 24 in detail.

FIG. 25 is a plan view illustrating an example of area Z of FIG. 24 in detail.

Referring to FIG. 25, in the display device 10 according to one or more other embodiments, the lens array layer MLL of the display panel 100_2 may include the plurality of lenses LNS located in the display area DAA, and may include the plurality of pattern portions EP_2 surrounding the display area DAA and spaced apart from each other. The pattern portions EP_2 may extend in the first direction DR1 and the second direction DR2, and may surround the display area DAA. The pattern portions EP_2 may include one or more linear patterns EP1 spaced apart from each other. The linear patterns EP1 may have a shape in which other patterns surround a pattern located adjacent to the display area DAA. Accordingly, in the pattern area ELA surrounding the display area DAA, a step may be formed in a portion where the linear patterns EP1 are located, and a portion where the linear patterns EP1 are spaced apart from each other. The resin layer DCR sprayed on the lens array layer MLL may be applied so as not to go beyond the pattern area ELA due to the step caused by the linear patterns EP1 located in the pattern area ELA.

According to one or more other embodiments, a plurality of linear patterns EP1 located in the pattern area ELA of the lens array layer MLL may be spaced apart from each other at regular intervals. For example, intervals W1 and W2 at which the plurality of linear patterns EP1 are spaced apart from other neighboring linear patterns EP1 may be the same as each other.

In the display device 10, the lens array layer MLL includes the pattern portions EP_2 having a different shape from the lenses LNS, such that the resin layer DCR may be positioned so as not to go beyond the pattern area ELA. Unlike one or more embodiments of FIG. 12, an edge of the resin layer DCR may not be completely aligned with the lens array layer MLL, and an area of the lens array layer MLL in plan view may be greater than an area of the cover layer DCL in plan view. Some of the pattern portions EP_2 of the lens array layer MLL may overlap the cover layer DCL, and some of the linear patterns EP1 located at the outermost portion may not overlap the cover layer DCL.

The linear patterns EP1 of the lens array layer MLL may have a height (e.g., predetermined height), but may have a smaller height than the lenses LNS of the display area DAA. A structure in which the linear patterns EP1 are spaced apart from each other to form the step may be similar to a structure that reduces or prevents the likelihood of the resin layer DCR overflowing, but the cover layer DCL may be located on the linear patterns EP1 by applying the resin layer DCR onto the lens array layer MLL. That is, the cover layer DCL may have a greater height than the linear patterns EP1.

Figure 26:
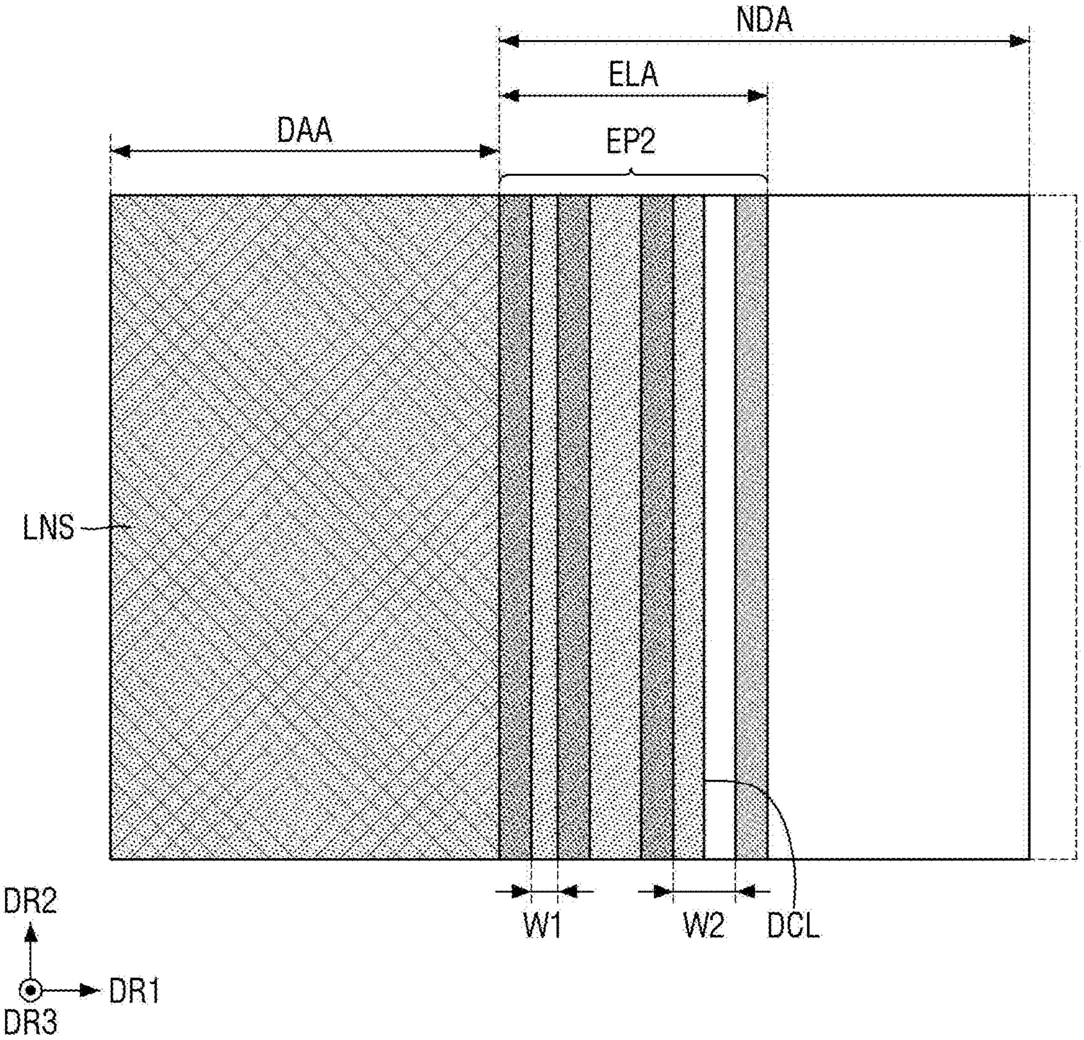
FIG. 26 is a plan view illustrating another example of area Z of FIG. 24 in detail.

FIG. 26 is a plan view illustrating another example of area Z of FIG. 24 in detail.

Referring to FIG. 26, in the display device 10 according to still one or more other embodiments, the lens array layer MLL of the display panel 100_2 may include a plurality of linear patterns EP2 located in the pattern area ELA, and intervals at which the linear patterns EP2 are spaced apart from each other may be different from each other. As an example, an interval W1 between a pair of linear patterns EP2 located most adjacent to the display area DAA among the plurality of linear patterns EP2 may be less than an interval W2 between a pair of linear patterns EP2 located at the outermost portion among the plurality of linear patterns EP2. In the lens array layer MLL, the plurality of linear patterns EP2 may be spaced apart from each other, and an interval at which the plurality of linear patterns EP2 are spaced apart from each other may increase toward the outside of the non-display area NDA. Accordingly, the resin layer DCR applied onto the lens array layer MLL may flow from the pattern area ELA toward the display area DAA.

Figure 27:
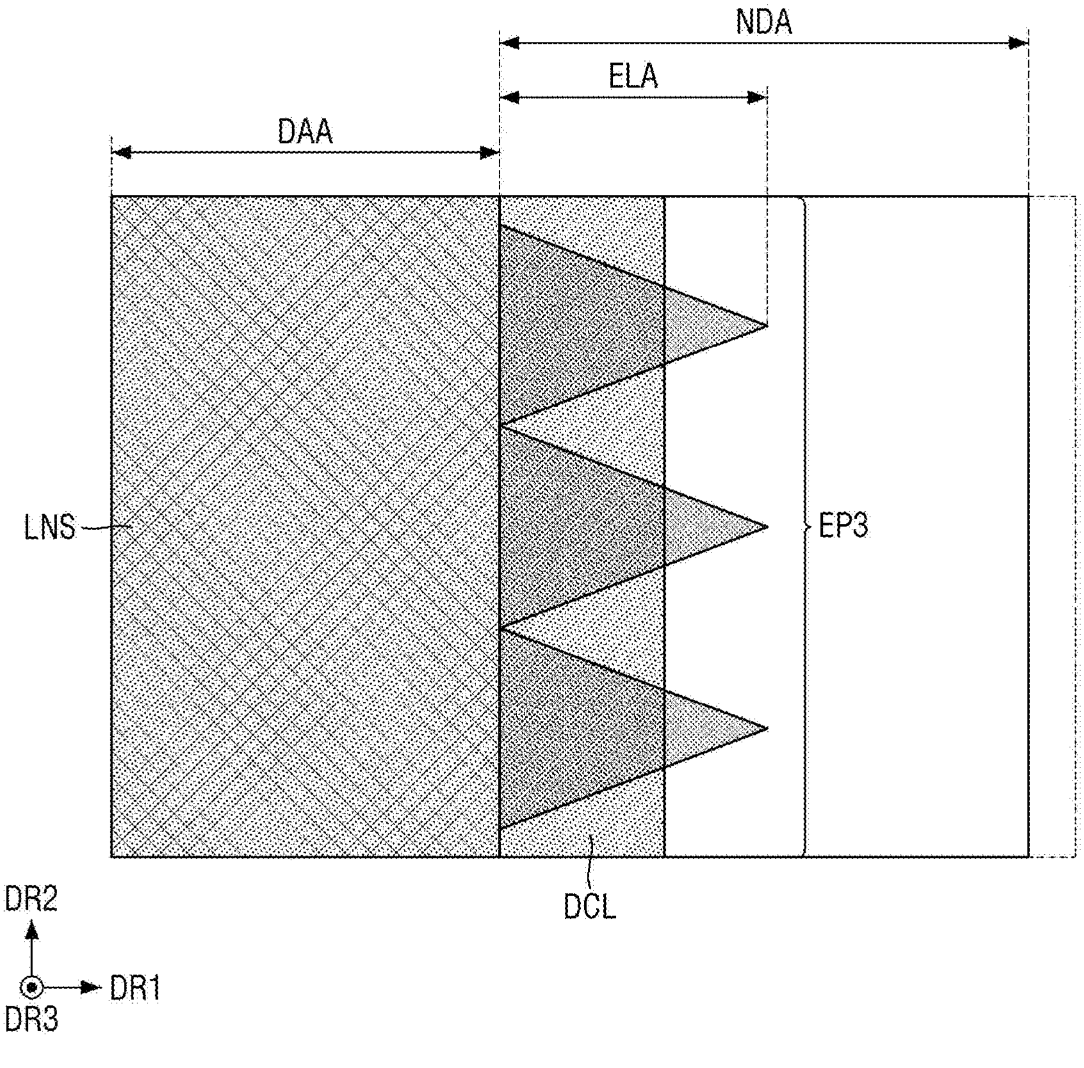
FIG. 27 is a plan view illustrating still another example of area Z of FIG. 24 in detail.

FIG. 27 is a plan view illustrating still another example of area Z of FIG. 24 in detail.

Referring to FIG. 27, in the display device 10 according to one or more other embodiments, the lens array layer MLL of the display panel 100_2 may include a plurality of triangular patterns EP3 located in the pattern area ELA. The triangular patterns EP3 may have a shape of which a width decreases from the display area DAA toward the outside of the non-display area NDA. The triangular patterns EP3 may be located so that one sides thereof having a great width face the display area DAA, and may be arranged to neighbor each other in the first direction DR1 and the second direction DR2. The lens array layer MLL includes the triangular patterns EP3 located in the pattern area ELA, such that the resin layer DCR applied onto the lens array layer MLL may flow from the pattern area ELA toward the display area DAA.

Figure 28:
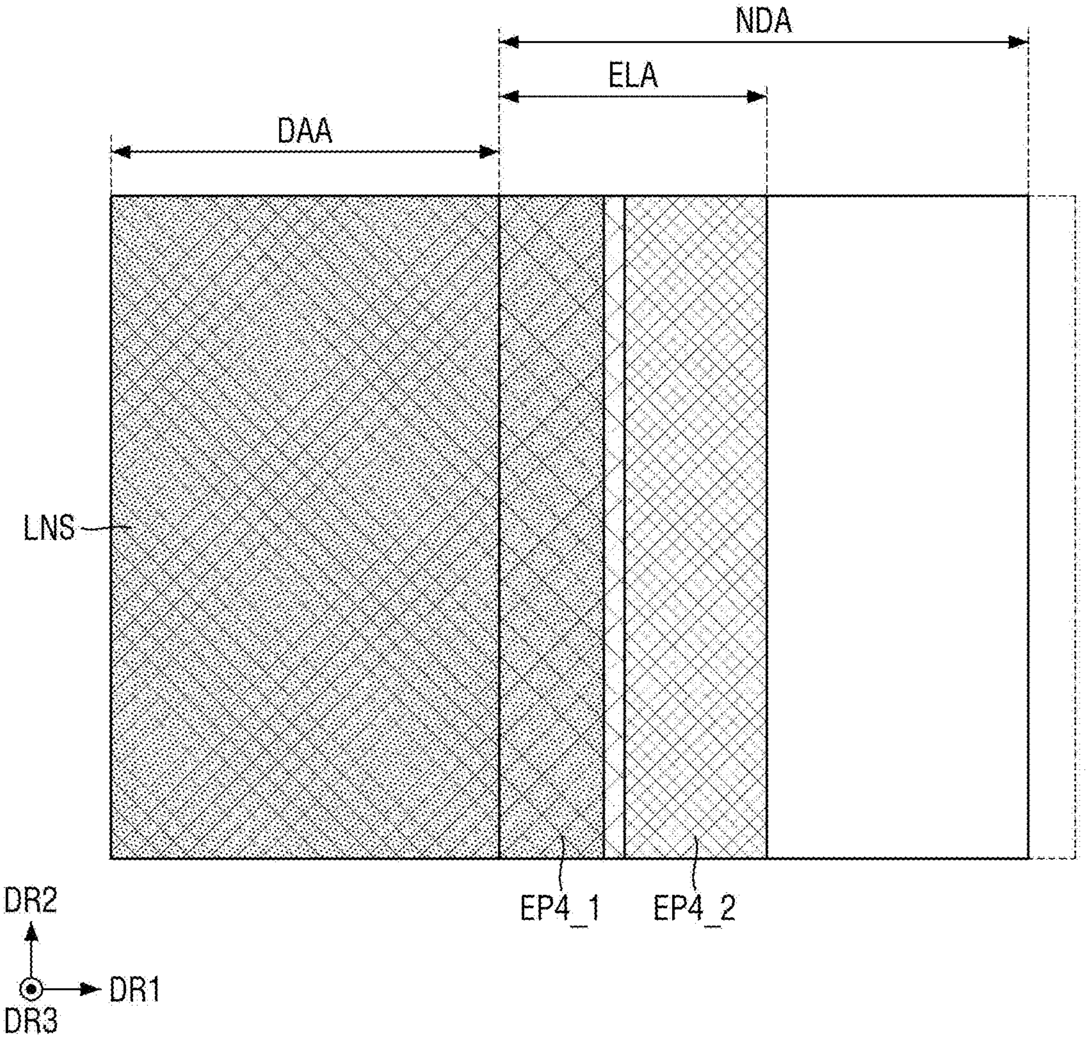
FIG. 28 is a plan view illustrating still another example of area Z of FIG. 24 in detail.

FIG. 28 is a plan view illustrating still another example of area Z of FIG. 24 in detail.

Referring to FIG. 28, in the display device 10 according to one or more other embodiments, the lens array layer MLL of the display panel 100_2 may include a plurality of lens pattern portions EP4_1 and EP4_2 located in the pattern area ELA. The lens pattern portions EP4_1 and EP4_2 may have a shape convex in the upward direction, similar to the lenses LNS located in the display area DAA, but densities of the patterns located per unit area in the lens pattern portions EP4_1 and EP4_2 may be different from each other.

For example, the lens array layer MLL may include a first lens pattern portion EP4_1 in which lens-shaped patterns having a lower density and a greater size than the lenses LNS located in the display area DAA are located, and a second lens pattern portion EP4_2 in which lens-shaped patterns, which has a higher density and a smaller size than the lenses LNS located in the display area DAA, are located. The first lens pattern portion EP4_1 may be located inside the second lens pattern portion EP4_2. That is, the first lens pattern portion EP4_1 may be located between the second lens pattern portion EP4_2 and the plurality of lenses LNS. The resin layer DCR applied onto the lens array layer MLL may not be further spread due to the lens-shaped patterns having different densities and sizes from the display area DAA toward the outside of the non-display area NDA.

Figure 29:
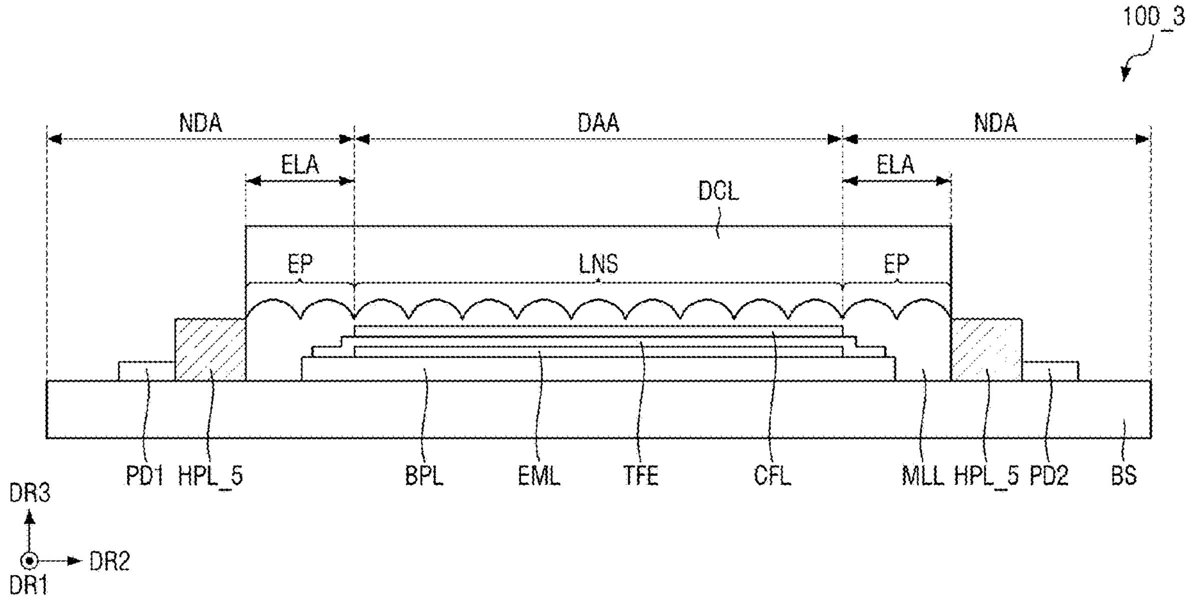
FIG. 29 is a schematic cross-sectional view, taken in a second direction, of a display panel of a display device according to one or more other embodiments.

FIG. 29 is a schematic cross-sectional view, taken in a second direction, of a display panel of a display device according to one or more other embodiments.

Referring to FIG. 29, a display device 10 according to one or more other embodiments may further include a coating layer HPL_5 located outside the pattern area ELA of the non-display area NDA of a display panel 100_3. The coating layer HPL_5 may include an organic material having physical properties opposite to those of the lens array layer MLL, and may more effectively reduce or prevent the likelihood of the resin layer DCR applied onto the lens array layer MLL being spread to the outside of the non-display area NDA. As an example, in one or more embodiments in which the lens array layer MLL includes a hydrophilic organic material, the coating layer HPL_5 may include a hydrophobic organic material.

FIGS. 30 to 33 are views sequentially illustrating some of fabricating processes of the display device according to one or more other embodiments.

Referring to FIGS. 30 to 33, during fabricating processes of the display device 10 according to one or more other embodiments, the resin layer DCR is not necessarily applied directly onto the lens array layer MLL, and may be applied onto a separate release film RFL. The resin layer DCR applied onto the release film RFL may be cured in a state in which it is in contact with the lens array layer MLL to form the cover layer DCL.

Figure 30:
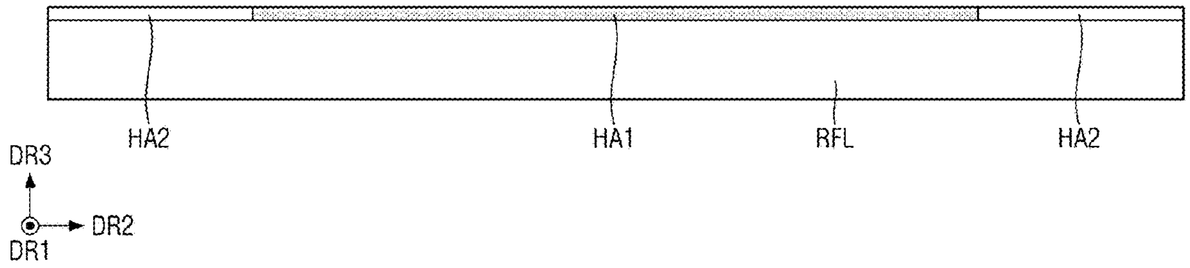
FIGS. 30 to 33 are views sequentially illustrating some of fabricating processes of the display device according to one or more other embodiments.

As illustrated in FIG. 30, a first coating area HA1 and a second coating area HA2 are formed on the release film RFL. The first coating area HA1 is an area where the resin layer DCR is applied, and may have physical properties familiar with an organic material of the resin layer DCR. As an example, the first coating area HA1 may be a hydrophilic coating area like the organic material of the resin layer DCR, and the second coating area HA2 may be a hydrophobic coating area.

Figure 31:
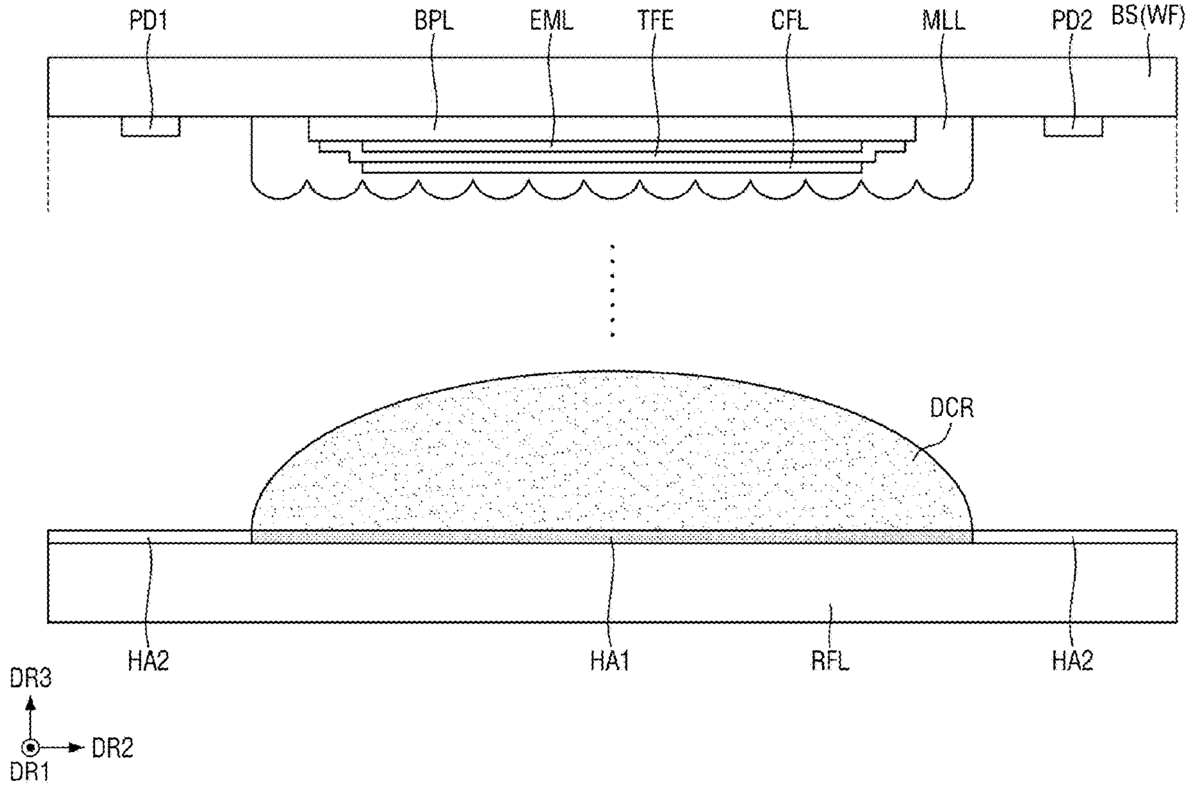

Subsequently, as illustrated in FIG. 31, the resin layer DCR is formed on the first coating area HA1 of the release film RFL, and the base substrate BS or the wafer substrate WF on which the display element layer EML and the lens array layer MLL are formed and the release film RFL are brought into contact with each other. Here, the resin layer DCR may be in contact with the lens array layer MLL, and may be self-aligned in an area of the lens array layer MLL where the lenses LNS and the pattern portions EP are formed.

Figure 32:
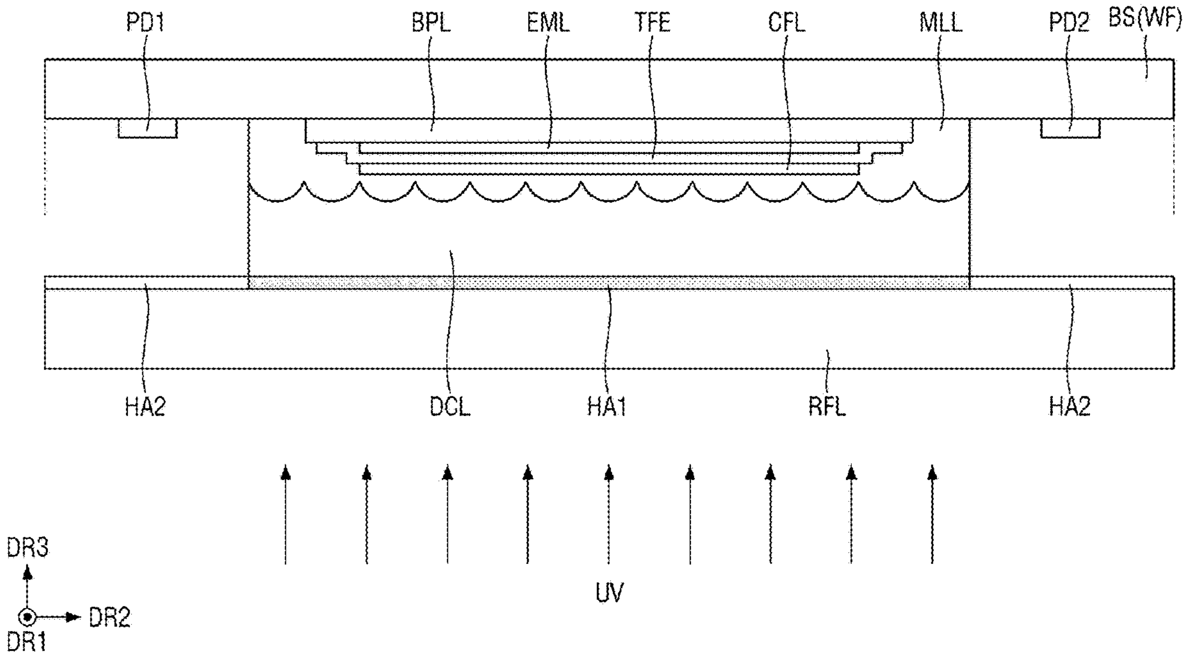
Figure 33:
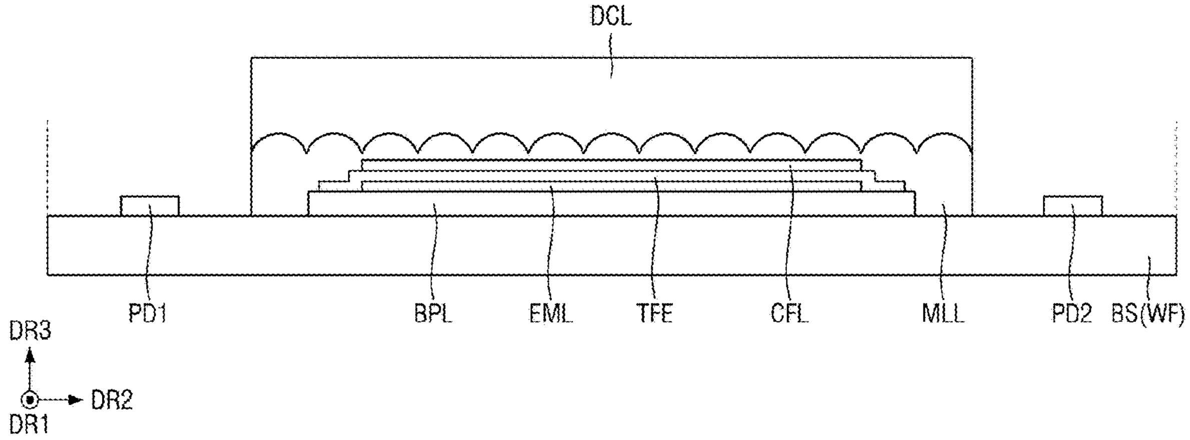

Subsequently, as illustrated in FIGS. 32 and 33, the resin layer DCR may be cured by UV irradiation or heat treatment to form the cover layer DCL, and the release film RFL may be removed to form the display panel 100. The method of fabricating the display device 10 may include a process of forming the resin layer DCR on the release film RFL and then bringing the resin layer DCR into contact with the lens array layer MLL instead of forming the resin layer DCR directly on the lens array layer MLL. Accordingly, a thickness of the cover layer DCL may be adjusted through an interval between the release film RFL and the wafer substrate WF, and the spacer SPL may be unnecessary.

Figure 34:
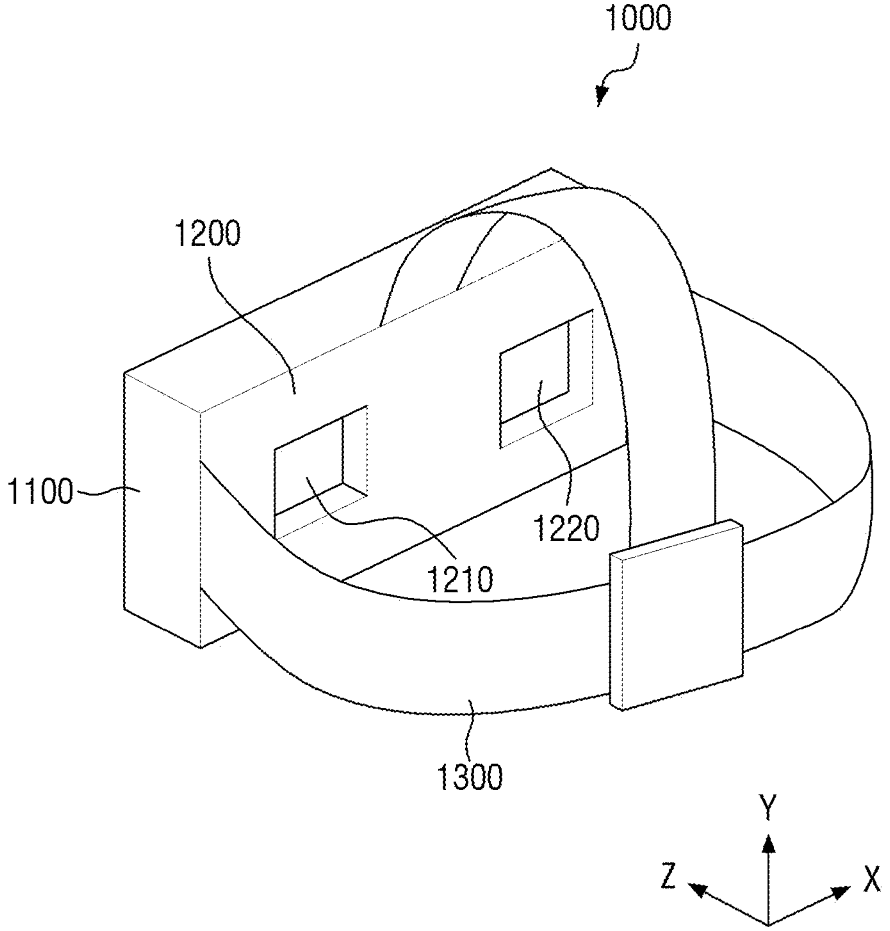
FIG. 34 is a perspective view illustrating a head mounted display device according to one or more embodiments.
Figure 35:
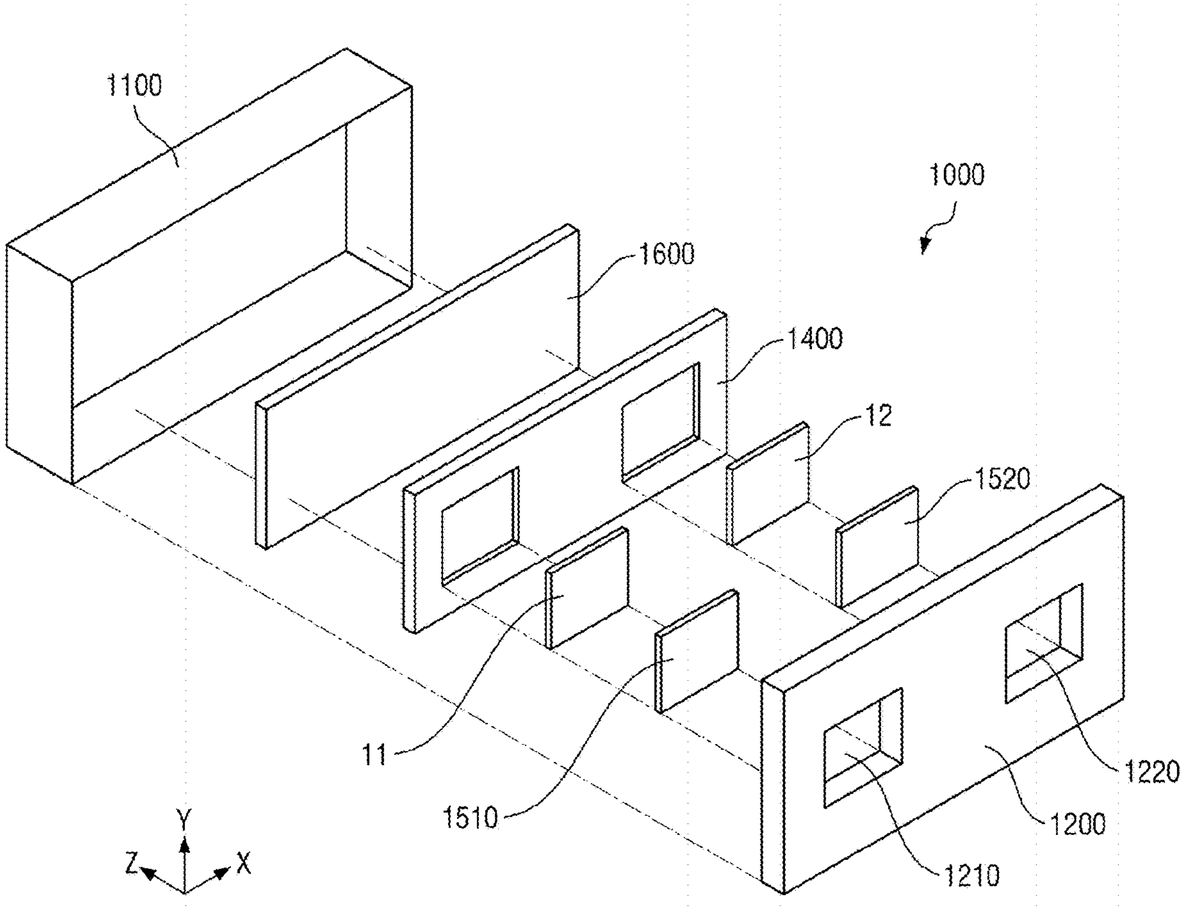
FIG. 35 is an exploded perspective view illustrating an example of the head mounted display device of FIG. 34.

FIG. 34 is a perspective view illustrating a head mounted display device according to one or more embodiments. FIG. 35 is an exploded perspective view illustrating an example of the head mounted display device of FIG. 34.

Referring to FIGS. 34 and 35, a head mounted display device 1000 according to one or more embodiments includes a first display device 11, a second display device 12, a display device housing part 1100, a housing part cover 1200, a first eyepiece 1210, a second eyepiece 1220, a head mounted band 1300, a middle frame 1400, a first optical member 1510, a second optical member 1520, a control circuit board 1600, and a connector.

The first display device 11 provides an image to a user's left eye, and the second display device 12 provides an image to a user's right eye. Each of the first display device 11 and the second display device 12 is substantially the same as the display device 10 described with reference to FIG. 1, and a description of the first display device 11 and the second display device 12 is thus omitted.

The first optical member 1510 may be located between the first display device 11 and the first eyepiece 1210. The second optical member 1520 may be located between the second display device 12 and the second eyepiece 1220. Each of the first optical member 1510 and the second optical member 1520 may include at least one convex lens.

The middle frame 1400 may be located between the first display device 11 and the control circuit board 1600 and located between the second display device 12 and the control circuit board 1600. The middle frame 1400 serves to support and fix the first display device 11, the second display device 12, and the control circuit board 1600.

The control circuit board 1600 may be located between the middle frame 1400 and the display device housing part 1100. The control circuit board 1600 may be connected to the first display device 11 and the second display device 12 through the connector. The control circuit board 1600 may convert an image source input from the outside into digital video data DATA, and transmit the digital video data DATA to the first display device 11 and the second display device 12 through the connector.

The control circuit board 1600 may transmit digital video data DATA corresponding to a left eye image optimized for the user's left eye to the first display device 11 and transmit digital video data DATA corresponding to a right eye image optimized for the user's right eye to the second display device 12. Alternatively, the control circuit board 1600 may transmit the same digital video data DATA to the first display device 11 and the second display device 12.

The display device housing part 1100 serves to house the first display device 11, the second display device 12, the middle frame 1400, the first optical member 1510, the second optical member 1520, the control circuit board 1600, and the connector. The housing part cover 1200 covers one opened surface of the display device housing part 1100. The housing part cover 1200 may include the first eyepiece 1210 on which the user's left eye is located and the second eyepiece 1220 on which the user's right eye is located. It has been illustrated in FIGS. 34 and 35 that the first eyepiece 1210 and the second eyepiece 1220 are separately located, but the present disclosure is not limited thereto. The first eyepiece 1210 and the second eyepiece 1220 may be merged as one eyepiece.

The first eyepiece 1210 may be aligned with the first display device 11 and the first optical member 1510, and the second eyepiece 1220 may be aligned with the second display device 12 and the second optical member 1520. Accordingly, a user may view an image of the first display device 11 magnified as a virtual image by the first optical member 1510 through the first eyepiece 1210, and may view an image of the second display device 12 magnified as a virtual image by the second optical member 1520 through the second eyepiece 1220.

The head mounted band 1300 serves to fix the display device housing part 1100 to a user's head so that the first eyepiece 1210 and the second eyepiece 1220 of the housing part cover 1200 may be maintained in a state in which they are located on the user's left eye and right eye, respectively. When the display device housing part 1100 is implemented to have a light weight and a small size, the head mounted display device 1000 may include an eyeglass frame as illustrated in FIG. 35 instead of the head mounted band 1300.

In addition, the head mounted display device 1000 may further include a battery for supplying power, an external memory slot for housing an external memory, and an external connection port and a wireless communication module for receiving an image source. The external connection port may be a universe serial bus (USB) terminal, a display port, or a high-definition multimedia interface (HDMI) terminal, and the wireless communication module may be a 5G communication module, a 4G communication module, a wireless fidelity (WiFi) module, or a Bluetooth module.

Figure 36:
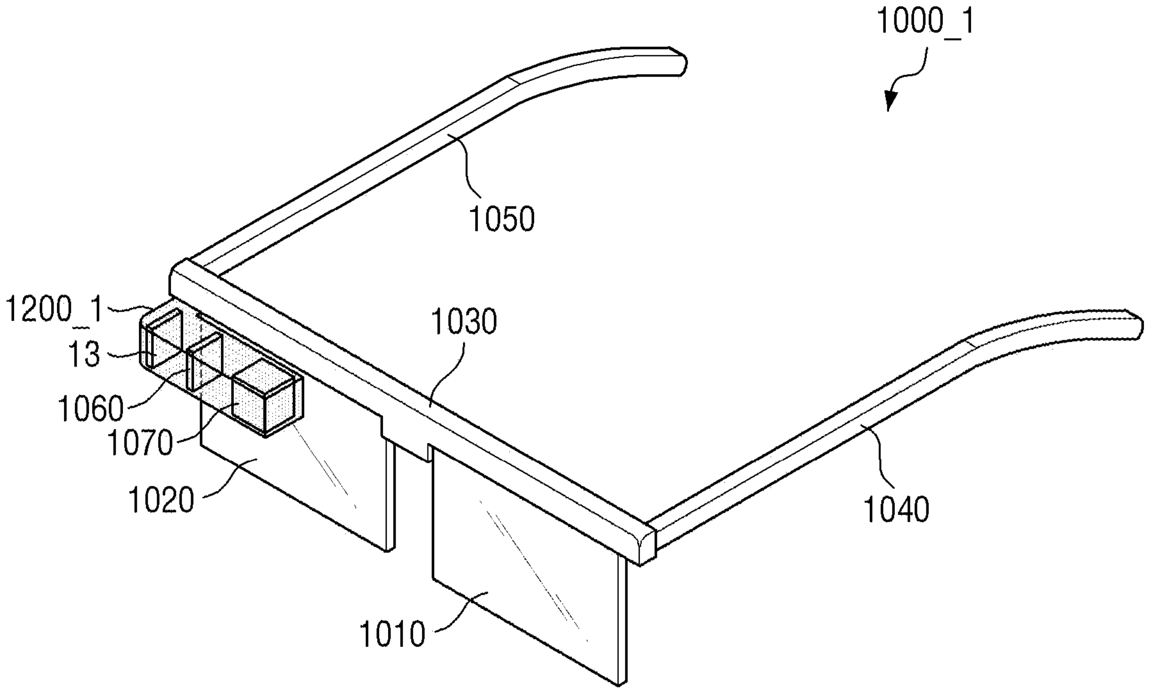
FIG. 36 is a perspective view illustrating a head mounted display device according to one or more other embodiments.

FIG. 36 is a perspective view illustrating a head mounted display device according to one or more other embodiments.

Referring to FIG. 36, a head mounted display device 1000_1 according to one or more other embodiments may be a glasses-type display device in which a display device housing part 1200_1 is implemented to have a light weight and a small size. The head mounted display device 1000_1 according to one or more other embodiments may include a display device 13, a left eye lens 1010, a right eye lens 1020, a support frame 1030, glasses frame legs 1040 and 1050, an optical member 1060, an optical path conversion member 1070, and a display device housing part 1200_1.

The display device housing part 1200_1 may include the display device 13, the optical member 1060, and the optical path conversion member 1070. An image displayed on the display device 13 may be magnified by the optical member 1060, converted in an optical path by the optical path conversion member 1070, and provided to a user's right eye through the right eye lens 1020. For this reason, a user may view an augmented reality image in which a virtual image displayed on the display device 13 through his/her right eye and a real image seen through the right eye lens 1020 are combined with each other.

It has been illustrated in FIG. 36 that the display device housing part 1200_1 is located at a right end of the support frame 1030, but the present disclosure is not limited thereto. For example, the display device housing part 1200_1 may be located at a left end of the support frame 1030, and in this case, an image of the display device 13 may be provided to a user's left eye. Alternatively, the display device housing parts 1200_1 may be located at both the left and right ends of the support frame 1030, and in this case, the user may view an image displayed on the display device 13 through both his/her left and right eyes.

In concluding the detailed description, those skilled in the art will appreciate that many variations and modifications can be made to the embodiments without substantially departing from the aspects of the present disclosure. Therefore, the disclosed embodiments are used in a generic and descriptive sense only and not for purposes of limitation.

What is claimed is:

1. A display device comprising:

a semiconductor substrate comprising a display area, a non-display area around the display area in a plan view, and transistors;

a light-emitting element layer above the semiconductor substrate, and comprising light-emitting elements in the display area;

an encapsulation layer above the light-emitting element layer;

a color filter layer above the encapsulation layer, and comprising color filters respectively overlapping the light-emitting elements;

a lens array layer above the color filter layer, in the display area, in a portion of the non-display area, and comprising:

lenses respectively overlapping the light-emitting elements and having a convex cross-sectional shape; and pattern portions in the non-display area around the lenses, and having a maximum thickness in a thickness direction of the semiconductor substrate that is greater than a maximum thickness of the lenses in the thickness direction, wherein a distance from the semiconductor substrate to a highest point of the lenses in the display area is a same as a distance from the semiconductor substrate to a highest point of the pattern portions in the non-display area; and a cover layer above the lens array layer.

2. The display device of claim 1, wherein the pattern portions have a same cross-sectional shape as the lenses.

3. The display device of claim 1, wherein an area of the cover layer in the plan view is substantially equal to an area of the lens array layer in the plan view.

4. The display device of claim 1, further comprising a light-blocking member on side surfaces of the lens array layer and the cover layer.

5. The display device of claim 1, further comprising a coating layer in the non-display area outside the lens array layer.

6. The display device of claim 1, further comprising an emission driver and a scan driver in the non-display area, wherein the lens array layer overlaps the emission driver and the scan driver.

7. The display device of claim 6, further comprising pads in the non-display area, and not overlapping the lens array layer.

8. A head mounted display device comprising:

a frame configured to be worn on a user's body, and corresponding to user's left and right eyes;

display devices in the frame; and eyepieces respectively on the display devices, wherein the display devices comprise:

a semiconductor substrate comprising a display area, a non-display area around the display area in plan view, and transistors;

a light-emitting element layer above the semiconductor substrate, and comprising light-emitting elements in the display area;

an encapsulation layer above the light-emitting element layer;

a color filter layer above the encapsulation layer, and comprising color filters respectively overlapping the light-emitting elements;

a lens array layer above the color filter layer, in the display area, in a portion of the non-display area, comprising lenses respectively overlapping the light-emitting elements in the display area and having a convex cross-sectional shape, and comprising pattern portions in the non-display area around the lenses and having a maximum thickness in a thickness direction of the semiconductor substrate that is greater than a maximum thickness of the lenses in the thickness direction, wherein a distance from the semiconductor substrate to a highest point of the lenses in the display area is a same as a distance from the semiconductor substrate to a highest point of the pattern portions in the non-display area; and a cover layer above the lens array layer.

* * * * *